(12) United States Patent
Baldemair et al.

(10) Patent No.: US 10,305,607 B2
(45) Date of Patent: *May 28, 2019

(54) METHOD AND ARRANGEMENT FOR SIGNALING OF PARAMETERS IN A WIRELESS NETWORK

(71) Applicant: Telefonaktiebolaget L M Ericsson (publ), Stockholm (SE)

(72) Inventors: Robert Baldemair, Solna (SE); Mats Sågfors, Kyrkslätt (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 412 days.

This patent is subject to a terminal disclaimer.

(21) Appl. No.: 14/792,218

(22) Filed: Jul. 6, 2015

(65) Prior Publication Data
US 2015/0311988 A1   Oct. 29, 2015

Related U.S. Application Data

(63) Continuation of application No. 13/061,243, filed as application No. PCT/SE2010/051055 on Oct. 1, 2010, now Pat. No. 9,106,380.
(Continued)

(51) Int. Cl.
*H04B 17/10* (2015.01)
*H04L 5/00* (2006.01)
(Continued)

(52) U.S. Cl.
CPC ........... *H04B 17/101* (2015.01); *H04L 5/001* (2013.01); *H04L 5/0053* (2013.01);
(Continued)

(58) Field of Classification Search
CPC ....... H04W 4/00; H04W 48/16; H04W 24/10; H04L 5/0053; H04L 5/0048
(Continued)

(56) References Cited

U.S. PATENT DOCUMENTS 5,611,931 A    3/1997  Liu et al.
9,106,380 B2*  8/2015  Baldemair .............. H04L 5/001
(Continued)

FOREIGN PATENT DOCUMENTS

CN    101034927 A    9/2007
CN    102067679 A    5/2011
(Continued)

OTHER PUBLICATIONS

Third Generation Partnership Program. "CC Index." 3GPP TSG RAN WG2 Meeting #70, R2-102794; May 10-14, 2010; Montreal, Canada; pp. 1-3.
(Continued)

*Primary Examiner* — Albert T Chou
(74) *Attorney, Agent, or Firm* — Coats & Bennett, PLLC

(57) ABSTRACT

A mobile terminal receives, over a first cell configured on a carrier frequency, at least one parameter associated with a second cell configured on a carrier frequency. The at least one parameter comprises a cell identity. The mobile terminal then derives at least one physical layer characteristic for the second cell based on the received at least one parameter. Thereby, the mobile terminal is able to receive transmissions over the second cell, even if it could not initially detect the presence of the cell.

20 Claims, 13 Drawing Sheets

Related U.S. Application Data

(60) Provisional application No. 61/356,726, filed on Jun. 21, 2010.

(51) Int. Cl.
*H04W 24/10* (2009.01)
*H04W 48/16* (2009.01)

(52) U.S. Cl.
CPC .......... *H04L 5/0073* (2013.01); *H04L 5/0091* (2013.01); *H04W 24/10* (2013.01); *H04L 5/0048* (2013.01); *H04W 48/16* (2013.01)

(58) Field of Classification Search
USPC ....................................................... 370/252
See application file for complete search history.

(56) References Cited

U.S. PATENT DOCUMENTS

| | | | |
|---|---|---|---|
| 2005/0233715 A1 | 10/2005 | Laroia et al. | |
| 2006/0214837 A1* | 9/2006 | Liu | G01S 7/021 342/52 |
| 2008/0019350 A1* | 1/2008 | Onggosanusi | H04J 11/0069 370/350 |
| 2008/0057966 A1 | 3/2008 | Kwon | |
| 2008/0192872 A1* | 8/2008 | Lindoff | H04J 11/0069 375/355 |
| 2008/0200171 A1 | 8/2008 | Jeong et al. | |
| 2009/0104905 A1 | 4/2009 | DiGirolamo et al. | |
| 2009/0191862 A1 | 6/2009 | Amirijoo et al. | |
| 2009/0219871 A1* | 9/2009 | Davis | H04W 76/066 370/329 |
| 2009/0249027 A1* | 10/2009 | Kim | H04L 25/03866 712/5 |
| 2009/0296661 A1* | 12/2009 | Lee | H04W 52/283 370/335 |
| 2009/0316659 A1 | 12/2009 | Lindoff et al. | |
| 2010/0046432 A1* | 2/2010 | Chang | H04B 7/068 370/328 |
| 2010/0056217 A1* | 3/2010 | Montojo | H04W 28/18 455/562.1 |
| 2010/0234028 A1* | 9/2010 | Narasimha | H04W 36/0055 455/437 |
| 2010/0238889 A1 | 9/2010 | Kim et al. | |
| 2010/0239034 A1 | 9/2010 | Lee et al. | |
| 2010/0279638 A1* | 11/2010 | Lindoff | H04L 25/0204 455/226.1 |
| 2010/0298017 A1 | 11/2010 | Dalsgaard et al. | |
| 2010/0322153 A1 | 12/2010 | Narasimha et al. | |
| 2011/0070897 A1* | 3/2011 | Tang | H04W 24/02 455/456.1 |
| 2011/0222457 A1* | 9/2011 | Lee | H04W 28/06 370/312 |
| 2011/0237269 A1 | 9/2011 | Chen | |
| 2012/0243499 A1* | 9/2012 | Moon | H04L 5/001 370/329 |
| 2013/0022005 A1* | 1/2013 | Yano | H04L 1/0046 370/329 |
| 2013/0088972 A1* | 4/2013 | Kim | H04L 5/001 370/241 |

FOREIGN PATENT DOCUMENTS

| | | |
|---|---|---|
| EP | 1944994 A1 | 7/2008 |
| RU | 2369006 C2 | 9/2009 |
| WO | 2009153165 A1 | 12/2009 |
| WO | 2010033073 A2 | 3/2010 |

OTHER PUBLICATIONS

Third Generation Partnership Program. "UE specific PDCCH monitoring set and cell specific linkage." 3GPP TSG RAN WG2 Meeting #69bis, R2-103039; May 10-14, 2010; Montreal, Canada; pp. 1-4.

Ericsson, St-Ericsson, "On Technical aspects on Heterogeneous Networks", 3rd Generation Partnership Project, 3GPP TSG-RAN WG1 #59bis, R1-100061, pp. 1-4, Jan. 18-22, 2010, Valencia, Spain.

Mediatek, "Clarification on dedicated SI", 3rd Generation Partnership Project, 3GPP TSG-RAN WG2 Meeting #70, Montreal, Canada, May 10-14, 2010, R2-102813, p. 2, paragraph X.3.1.

Ericsson, St-Ericsson, "Further Technical aspects on heterogeneous network support for Rel-10", 3rd Generation Partnership Project, 3GPP TSG-RAN WG1 #60, pp. 1-2, San Francisco, USA, Feb. 22-26, 2010, R1-100868.

Third Generation Partnership Project. "Stage 2 description of Carrier Aggregation." 3GPP TSG-RAN WG2 Meeting #70, R2-103427; May 10-14, 2010; pp. 1-23; Montreal, Canada.

* cited by examiner

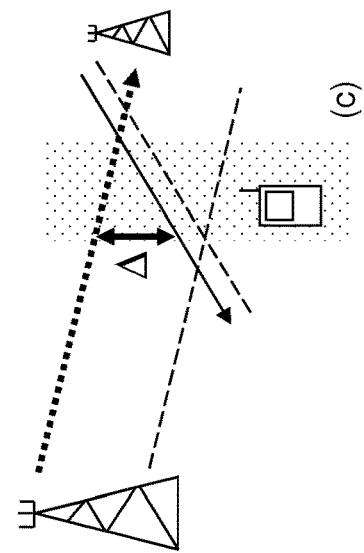
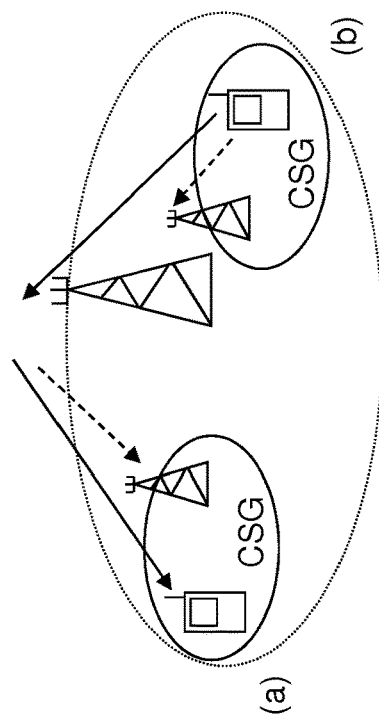
Figure 4

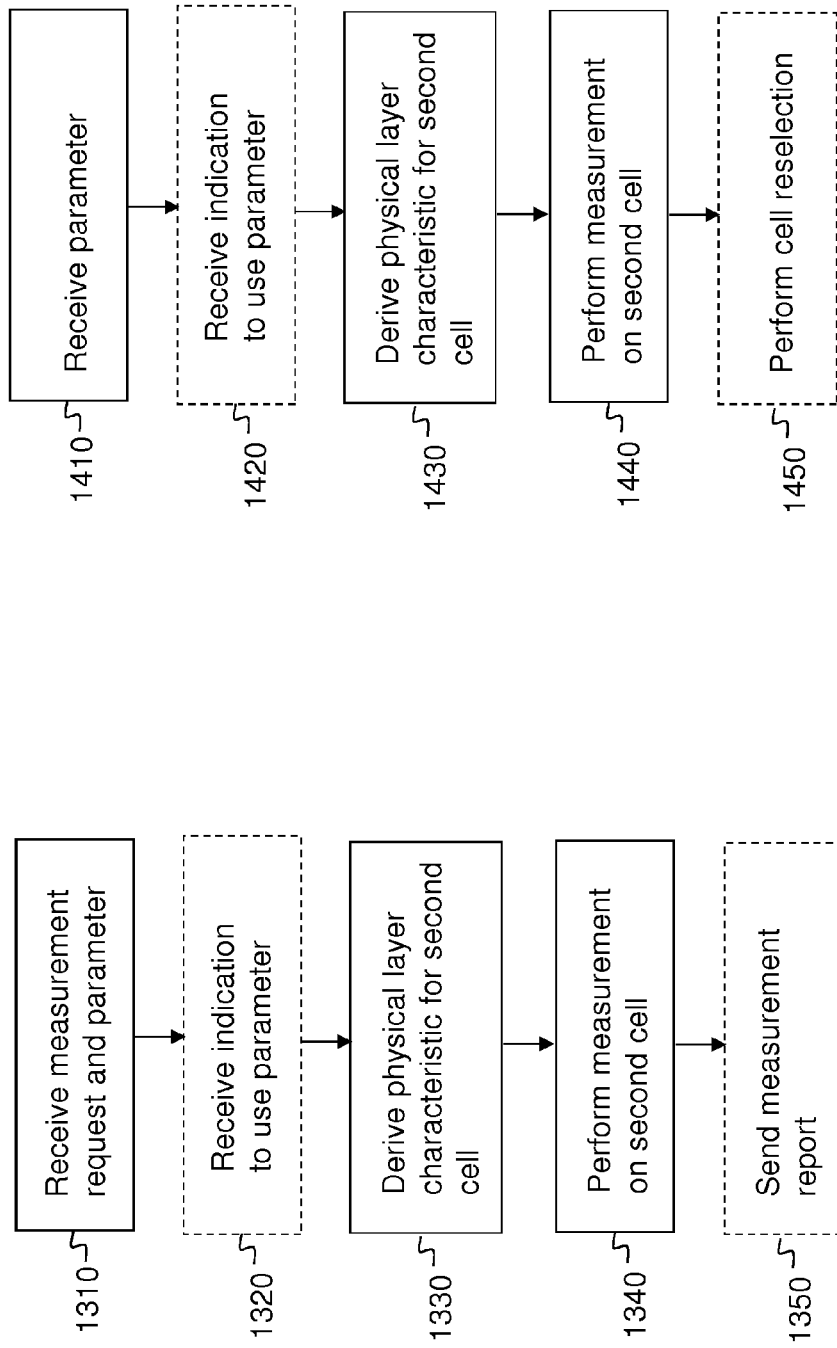

METHOD AND ARRANGEMENT FOR SIGNALING OF PARAMETERS IN A WIRELESS NETWORK

RELATED APPLICATIONS

This application is a continuation of U.S. application Ser. No. 13/061,243, filed Feb. 28, 2011, which was the National Stage of International Application No. PCT/SE2010/051055, filed Oct. 1, 2010, which claims the benefit of U.S. Provisional Application 61/356,726, filed Jun. 21, 2010, the disclosures of each of which are incorporated herein by reference in their entirety.

TECHNICAL FIELD

The present application relates to signaling techniques between a wireless mobile station and a network node in a wireless communications system. In particular, it relates to signaling of cell identity information in a wireless communications network.

BACKGROUND

The Long-Term Evolution (LTE) wireless communication system specified by the 3rd-Generation Partnership Project (3GPP) uses orthogonal frequency-division multiplexing (OFDM) in the downlink and discrete-Fourier-transform-spread OFDM in the uplink. The basic LTE downlink physical resource can thus be seen as a time-frequency grid. This is illustrated in FIG. 1, where each resource element corresponds to one OFDM subcarrier during one OFDM symbol interval.

In the time domain, LTE downlink transmissions are organized into radio frames of 10 milliseconds, each radio frame consisting of ten equally-sized subframes of length $T_{subframe}=1$ millisecond. The LTE frame structure is illustrated in FIG. 2.

Furthermore, the resource allocation in LTE is typically described in terms of resource blocks, where a resource block corresponds to one slot (0.5 milliseconds) in the time domain and 12 contiguous subcarriers in the frequency domain. Resource blocks are numbered in the frequency domain, starting with 0 from one end of the system bandwidth.

Earlier versions of the LTE standard, e.g. Release 8 and 9, support bandwidths up to 20 MHz. However, in order to meet the IMT-Advanced requirements, 3GPP has initiated work on LTE Release 10. One of the goals of LTE Release 10 is to support bandwidths larger than 20 MHz. However, one important requirement on LTE Release 10 is to assure backward compatibility with earlier versions of the standard. This backwards compatibility should also include spectrum compatibility. As a result, a LTE Release 10 carrier wider than 20 MHz should appear as a number of distinct LTE carriers to a legacy terminal, e.g. an LTE Release 8 or Release 9 terminal. Each such carrier can be referred to as a Component Carrier.

In particular for early LTE Release 10 deployments, it can be expected that there will be a smaller number of LTE Release 10-capable terminals compared to many LTE legacy terminals. Therefore, it is necessary to assure an efficient use of a wide carrier also for legacy terminals, i.e., that it is possible to implement carriers in such a manner that legacy terminals can be scheduled in all parts of the wideband LTE Release 10 carrier. The most straightforward way to obtain this would be by means of "carrier aggregation." Carrier aggregation implies that an LTE Release 10 terminal can receive multiple component carriers, where the component carriers have, or at least have the possibility to have, the same structure as a Release 8 carrier. The same structure as Release 8 implies that all Release 8 signals, e.g. primary and secondary synchronization signals, reference signals, and system information are transmitted on each carrier. Carrier aggregation is illustrated generally in FIG. 3.

During initial access, a carrier-aggregation capable terminal, e.g. a LTE Release 10 terminal, behaves similarly to a legacy terminal. Upon successful connection to the network, via a first carrier, a terminal may—depending on its own capabilities and the network—be configured with additional component carriers in the uplink and/or downlink. Configuration of these carriers is based on Radio Resource Control (RRC). Due to the heavy signaling and rather slow speed of RRC signaling, it is envisioned that a terminal may often be configured with multiple component carriers even though not all of them are used at a given instant. If a terminal is configured on multiple component carriers this implies it has to monitor all downlink component carriers for the corresponding Physical Downlink Control Channel (PDCCH) and Physical Downlink Shared Channel (PDSCH). This implies that a wider receiver bandwidth, higher sampling rates, etc., must generally be active, resulting in high power consumption for the mobile terminal.

To mitigate these problems, LTE Rel-10 supports a component carrier activation procedure, in addition to the configuration procedures. Accordingly, the terminal monitors only configured and activated component carriers for PDCCH and PDSCH. Since activation of component carriers is based on Medium Access Control (MAC) control elements—which are faster than RRC signaling—activation/de-activation can follow the number of component carriers that is required to fulfil the current data rate needs. Upon arrival of large data amounts, multiple component carriers are activated, used for data transmission, and then de-activated if not needed anymore. All but one component carrier, the downlink Primary component carrier (DL PCC), can be de-activated. Note that the PCC is not necessarily the same for all terminals in the cell, i.e. different terminals may be configured with different Primary component carriers. Activation therefore provides the possibility to configure multiple component carriers but only activate them on an as-needed basis. Most of the time a terminal would have one or very few component carriers activated, resulting in a lower reception bandwidth and thus lower battery consumption.

Scheduling of a component carrier is done on the PDCCH via downlink assignments. Control information on the PDCCH is formatted as a Downlink Control Information (DCI) message. In Release 8, a terminal only operates with one downlink and one uplink component carrier. As a result, the associations between downlink assignment, uplink grants and the corresponding downlinks and uplinks component carriers are clear. In Release 10, however, two modes of carrier aggregation need to be distinguished. The first case is very similar to the operation of multiple Release 8 or 9 terminals. In this mode a downlink assignment or uplink grant contained in a DCI message transmitted on a component carrier is either valid for the downlink component carrier itself or for a corresponding uplink component carrier. The association of uplink and downlink component carriers with one another can be cell-specific or UE-specific linking. In a second mode of operation, a DCI message is augmented with an indicator that specifies a component carrier, the Carrier Indicator Field (CIF). A DCI containing a downlink assignment with CIF is valid for the downlink component carrier indicated with the CIF. Likewise, a DCI containing an uplink grant with CIF is valid for the indicated uplink component carrier. This is referred to as cross-carrier scheduling.

It should be noted that the inventive techniques disclosed herein are not restricted to the particular terminology used here. It also should be noted that during the development of the standards for carrier aggregation in LTE, various terms have been used to describe, for example, component carriers. Those skilled in the art will appreciate, then, that the techniques of the present disclosure are therefore applicable to systems and situations where terms like multi-cell or dual-cell operation are used. In this disclosure, the term "primary serving cell" or "PCell" refers to a cell configured on a primary component carrier, PCC. A user equipment which is capable of carrier aggregation may, in addition to the PCell, also aggregate one or more secondary serving cells, "SCells". The SCells are cells configured on secondary component carriers, SCCs. Note that "cell" in this context refers to a network object, whereas "component carrier" or "carrier" refers to the physical resource, i.e. frequency band, that the cell is configured to use.

In the subsequent discussions, a basic heterogeneous network deployment scenario with two cell layers, here referred to as "macro layer" and "pico layer", respectively, is assumed. No specific assumptions are made regarding the characteristics of the different layers except that they correspond to cells of substantially different size of their respective coverage area, fundamentally defined by the coverage area of the basic control signals/channels, such as Primary Synchronization Channel, (PSS), Secondary Synchronization Channel (SSS), Physical Broadcast Channel (PBCH), Cell Specific Reference Signals (CRS), PDCCH, etc. Especially, what is referred to herein as a "pico layer" can be a micro layer, a conventional outdoor or indoor pico layer, a layer consisting of relays, or a Home e-Node B (HeNB) layer.

Various inter-cell interference scenarios can be anticipated for co-channel heterogeneous network deployments. FIG. 4 illustrates three scenarios that may cause severe interference. Cases (a) and (b) involve an HeNB operating in Closed Subscriber Group (CSG) mode. In the CSG mode, access to the HeNB is granted only to those subscribers that are members of a Closed Subscriber Group associated with the HeNB. The left-hand side of FIG. 4 illustrates how a HeNB in a femto cell causes interference towards a macro cell user that has no access to the femto cell (case (a)), and how a macro cell edge user with no access to a particular femto cell may cause interference towards the HeNB (case (b)). Inter-cell interference is indicated by the dotted arrows.

The right-hand side of FIG. 4, case (c), illustrates how the interference from a macro evolved-Node B (eNB) towards a pico or femto cell edge user increases, up to Δ, if path-loss-based serving-cell selection is used instead of selection based on the strongest received downlink signal. The solid and dotted lines illustrate Rx power, and the dashed lines show 1/pathloss. To understand why this increase in interference occurs, assume that the user equipment is in close proximity to the pico base station, but far away from the macro eNB. If the UE performs path-loss based cell selection the foot print of the pico eNB increases, i.e. the UE connects to the pico eNB where otherwise, using received signal power-based cell selection, it would have connected to the macro eNB since the received power is stronger. This implies that interfering signals from the macro eNB are stronger than desired signals from the pico eNB. On the uplink, however, the situation improves since the UE connects to that eNB to which it sees the lowest pathloss and thus the received power at the eNB is maximized.

The worst inter-cell interference issue in co-channel heterogeneous network deployments in LTE arise with respect to resources that cannot benefit from inter-cell interference coordination (ICIC). For schedulable data transmissions, such as PDSCH and Physical Uplink Shared Channel (PUSCH), inter-cell interference can be mitigated through inter-cell coordination, such as by via soft or hard physical resource partitioning. Coordination information can be exchanged across layers/cells via X2 interfaces, the standard interfaces between LTE radio base stations (eNBs). However, ICIC is not possible for signals that need to be transmitted on specific resources, e.g. parts of system information.

It is desirable that legacy mobile terminals (user equipments, or UEs, in 3GPP terminology) can operate and benefit from heterogeneous network deployments, such as by accessing any available pico layers to improve uplink performance, even when the received signal power from the macro layer is significantly higher. Such cell selection can be achieved, for example, by use of an offset applied to Reference Signal Received Power (RSRP) measurements carried out by the UE (corresponding to Δ in FIG. 4). The current specification allows for an offset up to 24 dB, which should be sufficient for most heterogeneous network scenarios.

To mitigate severe downlink inter-cell interference from macro eNBs towards control regions of pico subframes, operating layers on different carriers appears to be the only option to ensure robust communications for legacy mobile terminals in heterogeneous network deployments. This implies that the whole system bandwidth will not always be available for legacy mobile terminals and may result in reduced user throughputs. One example of reduced throughput would be a split of a contiguous system bandwidth of 20 MHz into two carries, e.g. 10 MHz bandwidth on each carrier.

As pointed out above, operating different layers on different non-overlapping carrier frequencies may lead to resource-utilization inefficiency. With the heterogeneous network illustration depicted in FIG. 5, this would imply that the overall available spectrum consists of two carriers f1 and f2, with f1 and f2 being exclusively used in the macro and pico layers, respectively. In the subsequent discussions, it is assumed that the layers are synchronized with time aligned eNB transmissions and that f1 and f2 have non-overlapping frequency bands.

In many cases it can be assumed that the pico layer is deployed to carry the main part of the traffic, and especially, to provide the highest data rates, while the macro layer provides full-area coverage, i.e., to fill any coverage holes within the pico layer. In such a case, it is desirable that the full bandwidth, corresponding to carriers f1 and f2, is available for data transmission within the pico layer. One can also envision cases when it is desirable, that the full bandwidth (f1 and f2) is available for data transmission also within the macro layer.

As already mentioned, sharing of the resources, i.e. operation on the same set of carriers, between the cell layers for data transmission can be accomplished by means of Inter-Cell Interference Coordination (ICIC) methods that can be more or less dynamic depending on the coordination capabilities between the layers, and their constituent radio base stations. However, interference concerns remain with respect to the transmission of signals and/or channels that cannot rely on traditional ICIC methods but need to be transmitted on specific, well-defined, resources. In LTE, these include, for example, the synchronization signals (PSS/SSS), the Physical Broadcast Channel (PBCH), and the layer1/layer 2 (L1/L2) control channels (PDCCH, PCFICH and PHICH).

Clearly, all these signals must be transmitted on at least one downlink carrier within each cell layer, as they are needed to enable a user equipment to detect, and connect to the cell. The downlink carrier on which these signals are always transmitted will be referred to as the primary carrier, or primary component carrier (PCC) in the following disclosure. It should be noted, however, that these signals may also be transmitted on one or more secondary component carriers, SCCs, and if this is the case, a user equipment may receive the signals either from the PCC, or from an SCC.

For the purposes of discussion, assume that the primary carrier, PCC, corresponds to carrier f1 in the macro layer and carrier f2 in the pico layer.

For the downlink situation, the three cases shown in FIG. 6 are considered below, where Case 1 differ from Case 2 with respect to the use of an Open Subscriber Group (OSG) in the former. In Case 3, both carriers, f1 and f2, are available also at the macro layer.

In Case 1, it is assumed that Carrier f1, which is the macro primary component carrier, or PCC, should be available for PDSCH transmission, i.e. traffic data transmission, also within the pico layer. It is assumed that a mobile terminal only accesses the macro layer when the path loss to the macro layer is of the same order or smaller, compared to the path loss to the pico layer.

In this case, the basic downlink control signals/channels above can be transmitted on f1 also in the pico layer with no severe interference to mobile terminals accessing the macro layer. Thus both f1 and f2 can be deployed as "normal", release 8 compatible, carriers in the pico layer. However, a legacy mobile terminal would only be able to access f1 close to the pico cell site where the path loss to the pico cell is much smaller than the path-loss to the macro cell, in order to avoid strong control-channel interference from the macro cell. Closer to the pico-cell border of the pico cell, carrier-aggregation capable UE:s, e.g. Release 10 mobile terminals, would need to access on carrier f2, to avoid strong interference to PSS/SSS and PBCH from the macro cell. However, these mobile terminals could be scheduled PDSCH transmissions on f1, using cross-carrier scheduling signaled via the PDCCH on f2. Note that, to avoid interference from cell-specific reference signals (CRS) for the macro layer, pico-cell PDSCH transmission on f1 must rely on UE-specific reference signals (RS) for channel estimation, at least when the UE is close to the pico-cell border. This is because CRS are typically transmitted on specific resources in the data region of a subframe, so that the CRS transmitted on f1 in the macro cell will collide with the CRS transmitted on f1 in the pico cell. One might consider using frequency shifts of CRS across layers, but the macro CRS would then cause interference towards data resource elements of the pico.

In case 2, similarly to case 1, carrier f1 should be available for PDSCH transmission also within the pico layer. However, a mobile terminal should be able to access the macro cell even when close to the pico cell. This scenario may occur when the pico layer consists of HeNBs belonging to Closed Subscriber Groups (CSGs), and when a mobile terminal not belonging to the CSG approaches a HeNB. The mobile terminal will not be allowed access to the HeNB, and must therefore connect to the macro cell instead. In this case, the pico layer must not transmit the channels above (PSS/SSS, PBCH, CRS, PDCCH, etc.) on f1, in order to avoid interference to the mobile terminals that are accessing the macro layer in the vicinity of a pico site. Rather, the corresponding resource elements should be empty, i.e. muted. Thus, legacy mobile terminals can only access the pico layer on f2 while Release 10 mobile terminals can be scheduled on both f1 and f2, in the same way as for case 1.

In Case 3, in addition to carrier f1 being available for PDSCH transmission within the pico layer, carrier f2 should be available for PDSCH transmission within the macro layer.

In this case, the macro layer must not transmit the basic downlink signals/channels above (PSS/SSS, PBCH, CRS, PDCCH, etc.) on f2, in order to avoid interference to mobile terminals that are accessing the pico layer and that may be in a location where signals from the macro layer are received with much higher power, even though the path loss to the pico layer is substantially smaller. Rather, as with case 2, the corresponding resource elements should be empty, i.e. muted. Thus, legacy mobile terminals can only access the macro layer on f1 while carrier-aggregation capable terminals, e.g. Release 10 mobile terminals, can be scheduled in the macro layer on both f1 and f2. It should be noted that a mobile terminal operating in this scenario can only be scheduled on the macro layer on f2 in such a way that it does not cause any severe interference to the pico cell, either by ensuring that there is no mobile terminal being scheduled on the corresponding resource in any pico cell under the coverage area of the macro cell, or by using low power for the macro-cell transmission, where possible.

Note that in the case where all pico cells are relatively far from the macro-cell site, one could transmit also the basic control signals/channels with reduced power on f2 from the macro-cell site. However, this would make the macro-cell on f2 appear as a separate pico cell, located at the same point as the macro cell on f1.

In LTE, the mobile terminals derive the physical cell ID for a cell from the synchronization signals PSS/SSS. Likewise, the number of transmit antenna ports is blindly derived from the CRC scrambling code of the PBCH. As a result, if signals are only transmitted with zero or reduced power on a secondary component carrier, i.e. in an SCell, the UE is unable to determine either the physical cell ID or the number of transmit antenna ports. The same problem may occur even if the signals are not muted, for instance if a UE is in the vicinity of a pico cell which is interfered by a macro cell transmitting with high power on the same carrier. In this case, the UE may not be able to hear and/or decode the synchronization signals from the pico cell due to the severe interference.

In LTE, the physical cell ID is used to derive uplink demodulation reference signals (DMRS), sounding reference signals (SRS), physical uplink shared channel (PUSCH) scrambling, PDSCH scrambling, physical uplink control channel (PUCCH) signaling, L1/L2 control signaling, reference signals (RS) for transmissions using Multi-Media Broadcast over a Single Frequency Network, etc. Likewise, the number of transmit antenna ports is needed by the mobile terminal in LTE, as it influences the CRS, layer mapping, precoding, L1/L2 control signaling, etc. The CRS, in particular, are needed to perform mobility measurements, if configured on a secondary component carrier.

Thus, if a UE is not able to receive the necessary control and synchronization signals from a cell, it will not be able to detect that cell or establish communication with it, e.g. to perform carrier aggregation, or perform mobility measurements. This may lead to reduced performance. If the UE is not able to aggregate a secondary carrier because it can't detect the SCell, the UE may not be able to use its full bandwidth capacity, leading to lower throughput. If the UE is not able to receive reference signals and perform mobility measurements on a neighboring cell, the UE may end up being served by a less-than-optimal cell, which will reduce performance.

SUMMARY

It is therefore an object of the present disclosure to provide mechanisms for improving performance and resource utilization in wireless networks.

As detailed further below, some embodiments set forth in this disclosure describe techniques to enable signaling of physical cell ID and number of transmit antenna ports for another component carrier on a component carrier. In particular, some embodiments relate to methods applicable in a system consisting of at least two cells, wherein information regarding the cell identity, or the number of transmit antenna ports, or both, is transmitted over a second cell signal.

Various embodiments in which this solution is embodied in the radio base station and the information is conveyed and transmitted from the radio-base-station are provided. These embodiments include solutions wherein the radio base station provides the aforementioned information by means of dedicated signaling, i.e., it is provided to specific mobile terminals with messages intended for each UE separately. In other embodiments, the information may be provided by broadcasting, such that the information may be simultaneously received by multiple user equipments.

Corresponding receiver methods in the mobile terminals are also covered by the present disclosure.

In some embodiments, a method in a user equipment is provided. The user equipment receives, over a first cell configured on a carrier frequency, at least one parameter associated with a second cell configured on a carrier frequency. The at least one parameter comprises a cell identity. The user equipment then derives at least one physical layer characteristic for the second cell based on the received at least one parameter, thereby enabling the user equipment to receive transmissions over the second cell.

In some embodiments, a method in a network node is provided. The network node serves a first cell configured on a carrier frequency. The network node transmits, over the first cell, at least one parameter associated with a second cell configured on a carrier frequency. The at least one parameter comprises a cell identity. The network node also transmits an indication to use the at least one parameter to derive at least one physical layer characteristic for the second cell.

In some embodiments, a user equipment is provided, comprising a transceiver and one or more processing circuits. The processing circuits are configured to receive, over a first cell configured on a carrier frequency, at least one parameter associated with a second cell configured on a carrier frequency. The at least one parameter comprises a cell identity. The processing circuits are further configured to derive at least one physical layer characteristic for the second cell based on the received at least one parameter, thereby enabling the user equipment to receive transmissions over the second cell.

In some embodiments, a network node is provided, comprising a transceiver and one or more processing circuits. The processing circuits are configured to transmit, over a first cell configured on a carrier frequency, at least one parameter associated with a second cell configured on a carrier frequency, wherein the at least one parameter comprises a cell identity. The processing circuits are further configured to transmit an indication to use the at least one parameter to derive at least one physical layer characteristic for the second cell.

By transmitting parameters associated with a second cell over a first cell, it is made possible for a user equipment to acquire these parameters, and use them to derive necessary physical layer characteristics for the first cell, even if the user equipment is not able to detect control and/or synchronization signals in the second cell. Once the physical layer characteristics have been derived, the user equipment may receive transmissions in the second cell, for instance to perform measurements, or to use the second cell as an SCell.

Thus, an advantage of some embodiments is that a user equipment may gain access to additional resources, thereby increasing the bandwidth available to the user equipment.

A further advantage of some embodiments is that throughput and/or channel quality may be improved, as the user equipment is able to perform measurements and possibly be handed over to a better cell, which it could not otherwise have detected.

BRIEF DESCRIPTION OF THE DRAWINGS

FIG. 4 is a schematic diagram illustrating inter-cell interference scenarios.

FIG. 13 is a flow chart illustrating a method according to an embodiment.

FIG. 14 is a flow chart illustrating a method according to an embodiment.

ABBREVIATIONS

CC Component Carrier
CIF Carrier Indicator Field

CRS Cell Specific Reference Signals
CSG Closed Subscriber Group
DCI Downlink Control Information
HeNB Home eNB
ICIC Inter-Cell Interference Coordination
MBSFN Multi-Media Broadcast over a Single Frequency Network
OFDM Orthogonal Frequency Division Multiple Access
OSG Open Subscriber Group
PBCH Physical Broadcast Channel
PCC Primary Component Carrier
PCFICH Physical Control Format Indicator Channel
PDCCH Physical Downlink Control CHannel
PDSCH Physical Downlink Shared Channel
PHICH Physical Hybrid-ARQ Indicator Channel
PSS Primary Synchronization Channel
PUCCH Physical Uplink Control Channel
PUSCH Physical Uplink Shared Channel
RRC Radio Resource Control
RS Reference Signals
SRS Sounding Reference Signals
SSS Secondary Synchronization Channel
UL DMRS UL Demodulation Reference Signals

DETAILED DESCRIPTION

Figure 1:
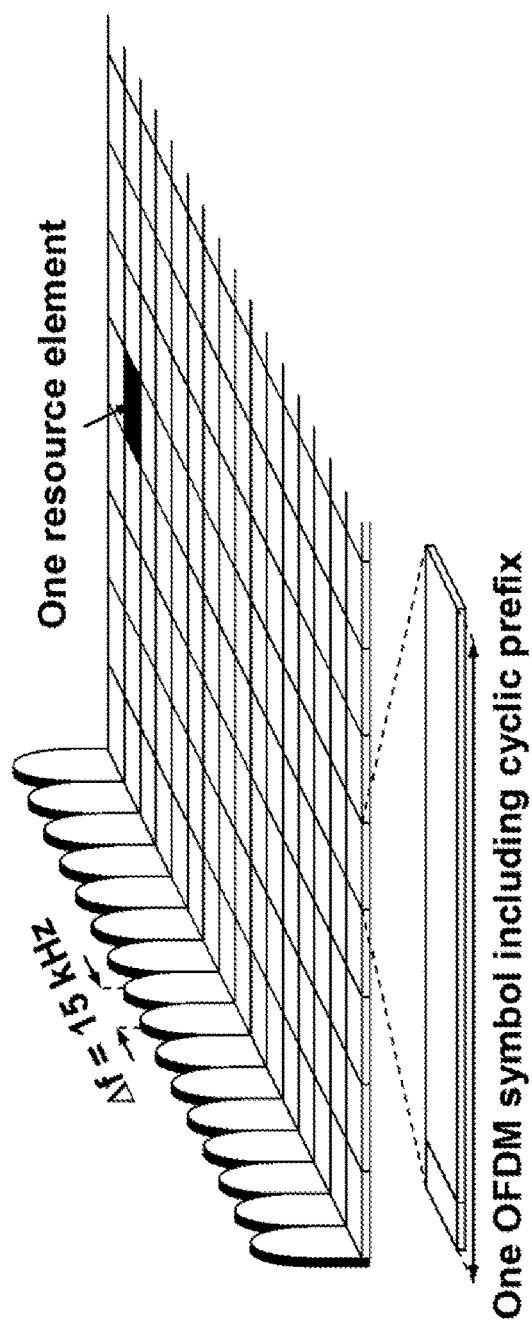
FIG. 1 is a schematic diagram illustrating the LTE downlink physical resource.
Figure 2:
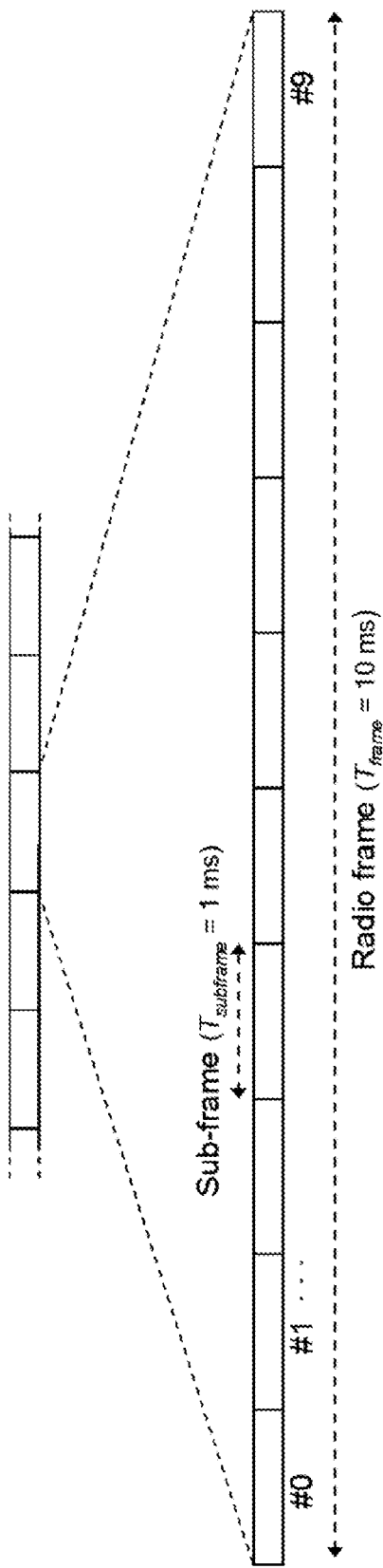
FIG. 2 is a schematic diagram illustrating the LTE time-domain structure.
Figure 3:
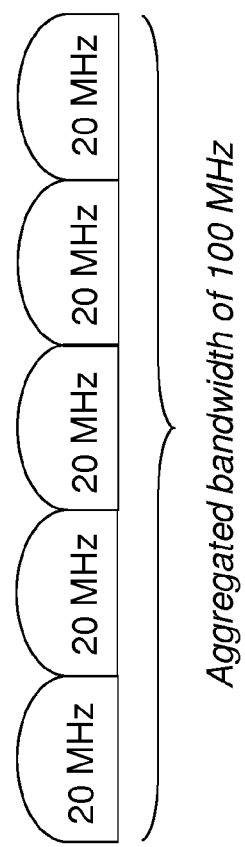
FIG. 3 is a schematic diagram illustrating Carrier Aggregation.
Figure 5:
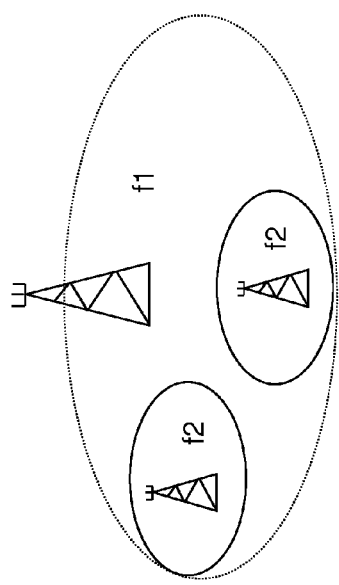
FIG. 5 is a schematic diagram illustrating frequency separation between different layers in a heterogeneous network.
Figure 6:
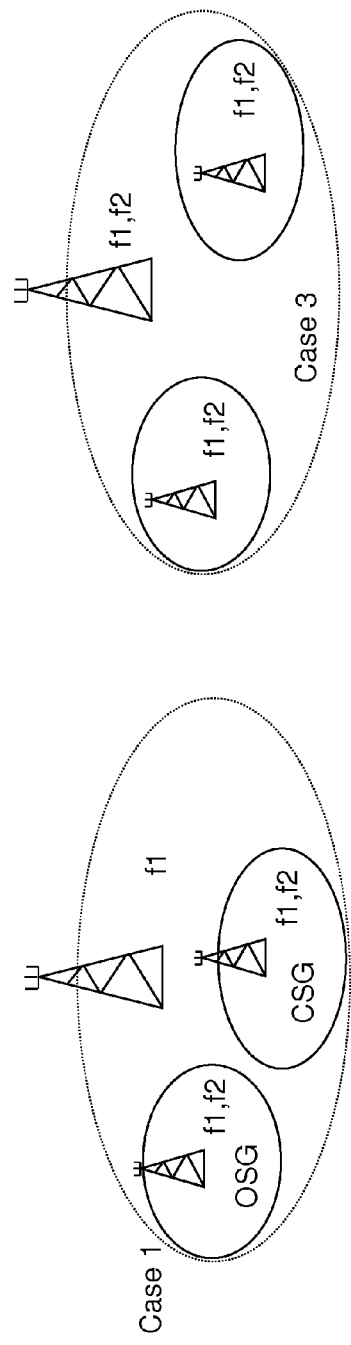
FIG. 6 is a schematic diagram illustrating different deployment options for heterogeneous networks.
Figure 7:
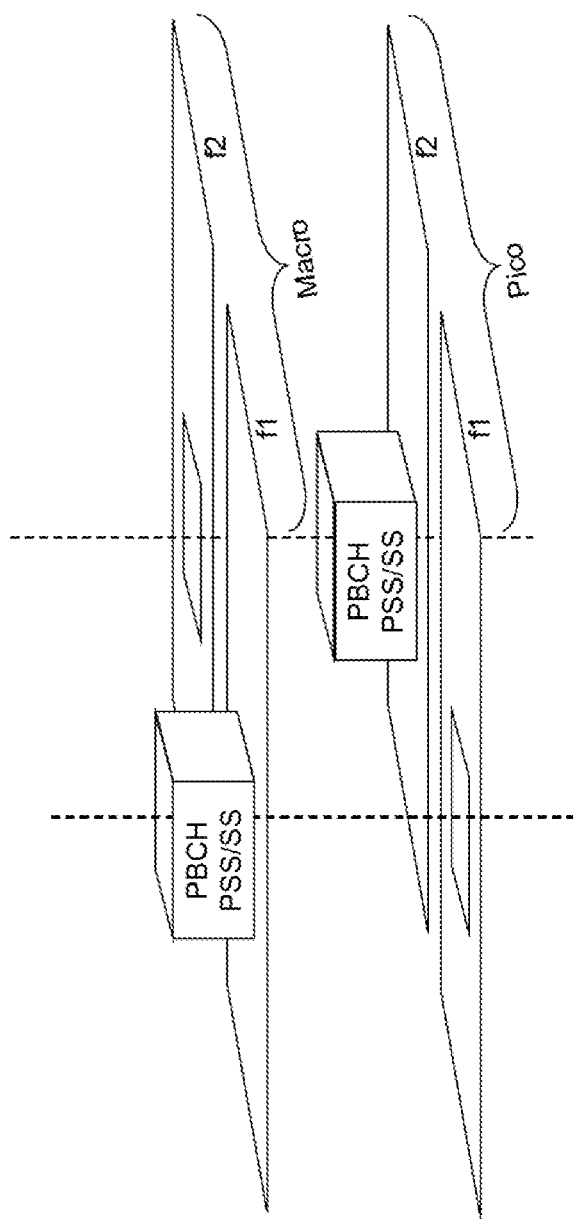
FIG. 7 is a schematic diagram illustrating muting in a heterogeneous network.

As explained above, in certain scenarios it is necessary to reduce, or even set to zero, the transmission power of PSS/SSS and/or PBCH on one component carrier, in order to protect corresponding signals transmitted from another node. This is illustrated in FIG. 7, which shows how a macro cell protects PSS/SSS and PBCH from a pico cell by transmitting its corresponding signals with zero/reduced power on carrier f2. If a mobile terminal shall be able to connect to the macro cell even close to the pico cell, e.g. if the pico cell is a CSG cell to which the terminal does not have access, then the pico cell has to transmit PSS/SSS and PBCH with zero or reduced power on f1. This means that a mobile terminal may not be able to derive certain important parameters associated with the component carrier which is muted. For instance, the cell ID and number of TX antenna ports cannot be determined if the PSS/SSS and PBCH can't be detected. Without knowledge of the cell ID and/or the number of TX antenna ports corresponding to a given cell, or a given component carrier, the mobile terminal cannot determine reference signals, scrambling sequences, etc. for that component carrier, e.g. SCell. As already mentioned, the problem is not limited to scenarios where muting is applied, but may occur whenever the PSS/SSS and/or PBCH cannot be detected, for instance due to severe interference from a neighboring cell. In all these cases, the end result is that the mobile terminal will be unable to detect the presence of the cell, perform measurements, and/or establish communication with the cell.

Figure 8:
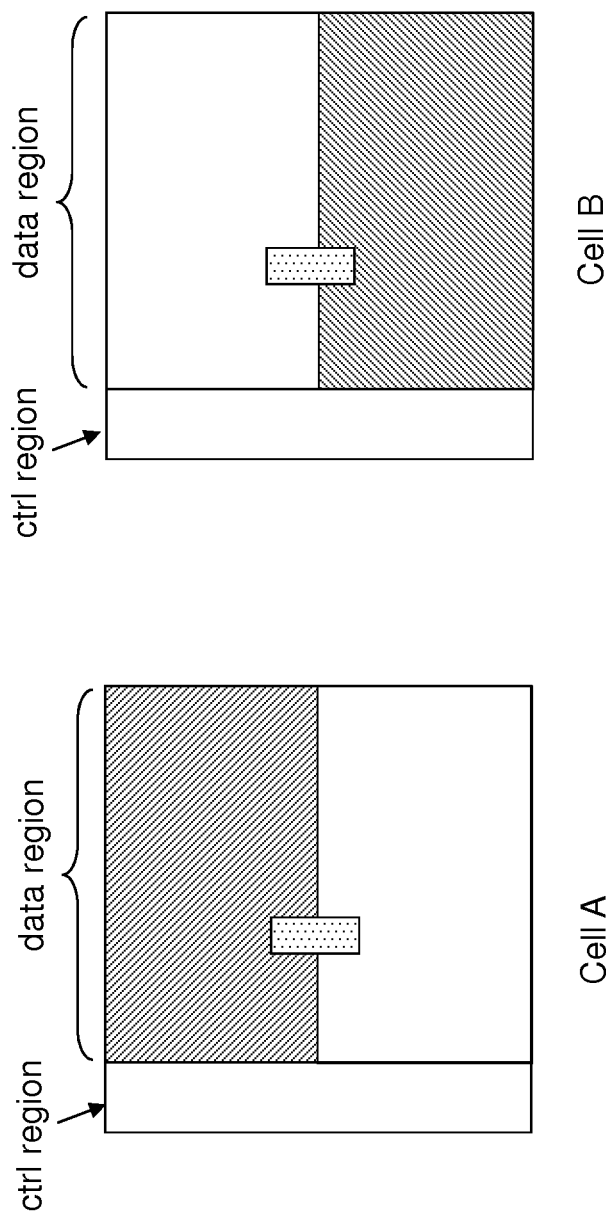
FIG. 8 is a schematic diagram illustrating inter-cell interference coordination (ICIC).

However, even if the mobile terminal is not able to detect the synchronization and broadcast channels, it may still be possible and beneficial for the terminal to establish communication with the cell. As mentioned earlier, synchronization and system information, such as PSS/SSS and PBCH, must be transmitted on certain well-defined resources. This is illustrated in FIG. 8, where a dotted square inside the data region schematically illustrates the location of synchronization channels. These channels are always transmitted in the same location in cells A and B, and if cell A and B use the same carrier frequency, interference will result. However, for data in the data region it is possible to use ICIC methods to ensure that transmissions do not collide between cells A and B. In this example, the frequency resources in the data region have been partitioned so that cell A uses one part of the data region, while cell B uses another part, as indicated by the slashed regions in FIG. 8. Thus, the data regions will not interfere with each other. Provided that a mobile terminal could detect and establish communications with both cells A and B, the mobile terminal should have no problem receiving and/or transmitting data that is comprised in the data region.

In various embodiments of the present disclosure, the above-mentioned problem is addressed by transmitting at least one parameter associated with a cell, e.g. a secondary cell (SCell), in another cell, e.g. a primary cell (PCell). In other words, a parameter such as the cell ID of the cell, e.g. secondary serving cell (SCell) that is configured on the carrier frequency, e.g. component carrier which transmits PSS/SSS with reduced or zero power is signaled in another cell. Also, the number of transmit antenna ports a component carrier is configured with may be signaled in another cell if the PBCH cannot be detected, e.g. because it is transmitted with reduced/zero power. Furthermore, in some scenarios it may be possible to transmit CRS with reduced/zero power—in such cases it is possible to signal this to the terminal, to avoid unspecified behavior in the terminal.

Thus, the mobile terminal receives the required parameters for a cell, e.g. SCell, which are not possible to detect and/or derive from the cell's own transmissions, from another cell, e.g. PCell, which the terminal is able to detect. With knowledge of cell ID and number of TX antenna ports, the mobile terminal is capable of reconstructing reference signals, scrambling sequences, etc. needed for uplink and downlink operation in the cell, e.g. SCell. Other parameters, such as carrier frequency, bandwidth and cyclic prefix length indication, may also be signaled in the other cell, e.g. PCell. However, in certain circumstances the mobile terminal may be able to assume default values for some or all parameters; thus, it may not be necessary to signal all these parameters in the other cell. As an example, a mobile terminal may assume that the number of antenna ports, bandwidth etc. are the same in the SCell as in the PCell, if these parameters are not signaled in the PCell.

To perform mobility measurements, a mobile terminal needs to be able to reconstruct the cell-specific reference signals (CRS) and needs to know the carrier frequency of the other cell, e.g. SCell (secondary serving cell). Techniques for signaling the carrier frequency of a SCell to a mobile have previously been disclosed. For instance, see R2-103427, Change Request CR 0230 to 36.300, "Stage 2 description of Carrier Aggregation", 3GPP TSG-RAN WG2 Meeting #70, Montreal, Canada, 10-14 May 2010. Given knowledge of the carrier frequency of the other cell, e.g. SCell, combined with the techniques disclosed herein for signaling the cell ID, a terminal can reconstruct the CRS and thus perform mobility measurements in the other cell, e.g. SCell.

Some deployment scenarios may require that the CRS are transmitted with reduced/zero power in an SCell. In this case, demodulation by the mobile terminal relies on UE-specific reference signals. Even if a terminal is now capable to reconstruct the CRS it will not measure anything meaningful since no CRS are present. To avoid undesirable mobile terminal behavior, e.g., the mobile terminal is configured with a secondary cell SCell, but mobility measurements indicate that this cell is not present, it may be advantageous to signal to the terminal that no CRS are present, or at least they are not detectable, in the SCell. In such a case, the mobile terminal may be configured so that it does not provide any mobility measurements based on CRS on the corresponding cell object.

Both the cell ID and number of transmit antenna ports are generally static parameters, and thus are expected to change only on a very slow basis. A good signaling choice is therefore to signal cell ID and the number of transmit antenna ports of a cell, e.g. SCell, using semi-statically signaling, e.g. RRC signaling, in another cell, e.g. the primary serving cell (PCell) or another SCell.

This signaling is not needed in all scenarios, therefore signaling of these values may be enabled on an optional basis. This may be achieved e.g. by defining information elements for "Number of TX antenna ports of SCell" and "Cell ID of SCell" that are optionally included in a message of the semi-static signaling protocol. The required information may be transmitted to the terminal via dedicated signaling or via broadcast. Accordingly, a terminal configured with at least one secondary cell, SCell, receives required information regarding this secondary cell, SCell, via dedicated signaling or broadcasting. Thus, on top of previously defined system parameters a terminal may optionally receive additional parameters defined in this disclosure.

Those skilled in the art will appreciate that cells configured on separate frequencies may sometimes use the same cell identity. In such cases, it may be unnecessary to explicitly signal this information to the mobile terminal, even if it is realized that a mobile terminal needs this information. Thus, according to one specific embodiment, if a terminal does not receive the newly defined information element "Cell ID of SCell", then it reuses the cell ID from an already configured cell, either from the primary serving cell PCell or another configured secondary cell, e.g. from a second SCell that is used to convey system parameters for a first SCell. If a terminal, however, receives the information element "Cell ID of SCell" it will use this parameter to derive cell ID in the SCell.

This same mechanism is also applicable to the new parameter "Number of TX antenna ports of SCell". If a terminal does not receive this information element, it will apply the number of TX antenna ports in the primary serving cell PCell or another configured secondary cell, e.g., from a second SCell that is used to convey system parameters for the first SCell. If the information element "Number of TX antenna ports of SCell" is received by the terminal, on the other hand, it will assume this parameter to derive number of TX antenna ports in the SCell.

If no CRS are transmitted, or if CRS are transmitted with reduced/zero power, in a secondary cell SCell this may lead to unspecified mobile terminal behavior. To avoid this, the optional information element "CRS not present in SCell" may be transmitted, in some embodiments. If this information element is received by the terminal it does not assume the presence of CRS in the secondary cell SCell. If this information element is not received the terminal assumes CRS are transmitted in the secondary cell SCell.

Figures 10, 11:
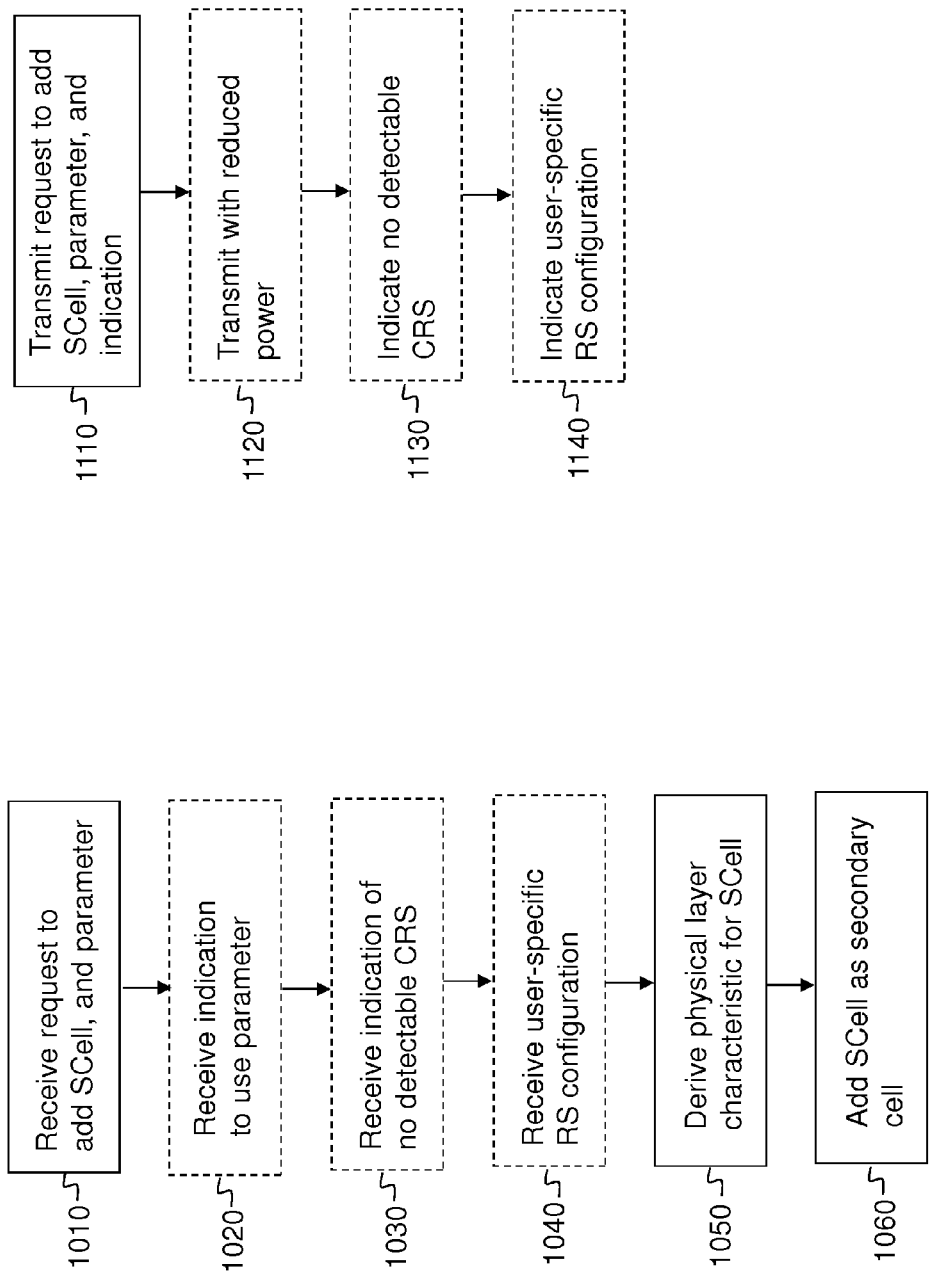
FIG. 10 is a flow chart illustrating a method according to an embodiment.
FIG. 11 is a flow chart illustrating a method according to an embodiment.

A method in a user equipment according to an embodiment will now be described with reference to FIG. 9 and the flowchart in FIG. 10.

Figure 9:
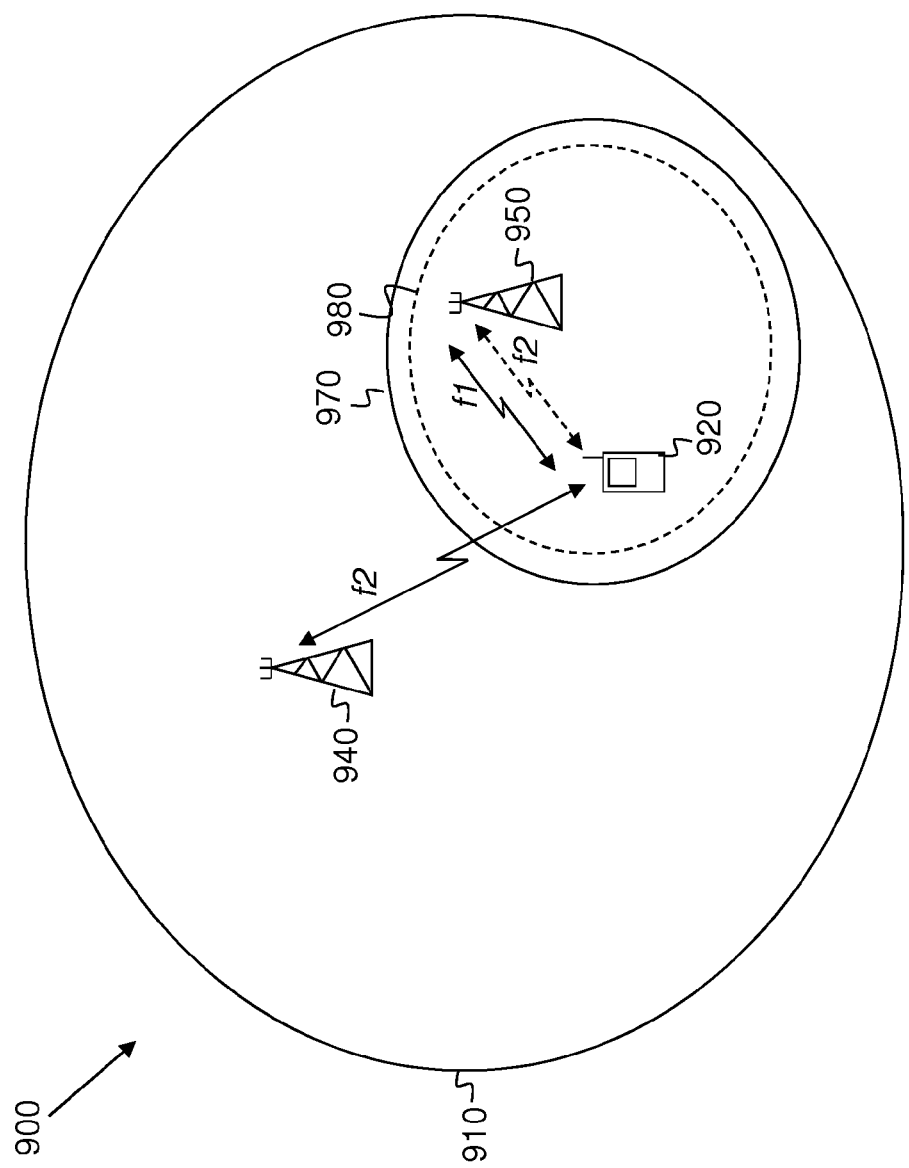
FIG. 9 is a schematic diagram illustrating a wireless communications network according to an embodiment.

FIG. 9 is a schematic drawing illustrating a wireless network 900 comprising a macro cell 910 and a pico cell, where the coverage area of the pico cell is contained within the coverage area of the macro cell 910. The macro cell 910 operates on carrier frequency f2, and is served by macro base station 940, e.g. an LTE eNB. The pico cell operates on carrier frequencies, or component carriers, f1 and f2, where f1 is a different carrier frequency from f2. Thus, there are actually two cells configured in the pico cell: a first cell 970 configured on component carrier f1, and a second cell 980 configured on component carrier f2. As described above, synchronization signals, reference signals, etc. will be transmitted in both cells 970 and 980. The pico cell, comprising cells 970 and 980, is served by pico base station 950, which may for instance be an LTE home base station, HeNB. A user equipment 920 is located within the coverage area of both the macro cell 910, and the cells 970 and 980. In this example, the user equipment 920 is a mobile terminal capable of carrier aggregation, e.g. an LTE Release 10-compliant UE. The user equipment 920 is initially connected to the first cell 970, which is configured on f1; thus, from the point of view of user equipment 920, the first cell 970 is the primary serving cell, or PCell. It would be advantageous for user equipment 920 to also add the second cell 980 as a secondary cell (SCell), since this would increase the available bandwidth for the user equipment 920. However, the assumption in this example is that user equipment 920 is not able to detect and/or decode control and synchronization information transmitted over the second cell 980, i.e. the cell configured on carrier frequency f2. As explained earlier, this problem may occur e.g. because the macro base station 940 is transmitting at a much higher power on f2, causing so much interference in the cell 980, and in particular on the synchronization channels PSS/SSS and broadcast channel PBCH, that the signal from the pico base station 950 on carrier f2 is not detectable. Therefore, user equipment 920 is not able to acquire necessary parameters, e.g. cell id, for the second cell 980, and it thus cannot add the second cell as an SCell using standard mechanisms.

According to the method, the user equipment 920 receives, 1010, a request to add a secondary cell, SCell. The request is received over the first cell 970. The request to add the SCell comprises the cell identity of the second cell 980. In some variants, the cell identity is the physical cell identity of the second cell 980.

In some variants of this embodiment, the request may also comprise other parameters associated with the second cell 980. For example, one or more of the parameters carrier frequency, number of transmit antenna ports, bandwidth, or cyclic prefix length indication related to the second cell 980 may be received over the first cell 970. However, if the user equipment 920 does not receive one or more of these parameters, the user equipment 920 may assume default values for any parameters that were not received. In particular, the user equipment 920 may assume that the non-received parameters have the same value in the second cell 980 as in the first cell 970. Therefore, it is not necessary that all parameters associated with the second cell 980 are received over the first cell 970.

In some variants, the user equipment 920 also receives, 1020, an indication over the first cell 970 to use the received parameters, i.e. the cell id and any additional parameters, to derive at least one physical layer characteristic for the second cell 980. In other words, the indication tells the user equipment 920 that it should derive the physical layer characteristic from the received parameter, instead of trying to detect it in the air. An advantage of receiving the indication is that the user equipment does not need to spend time and resources on unnecessary attempts to decode signals from the second cell 980, which could not be successful anyway. However, in other variants the user equipment 920 always uses the received parameters, if present, to derive the physical layer characteristics. In yet other variants, the user equipment 920 first tries to detect the parameters for the second cell 980 over the air, and if this fails it uses the parameters received over the first cell 970.

It should be noted that the indication may be received in the same message as the at least one parameter, or it may be received in a separate message. The indication may be realized as a flag, e.g. using one or more unused bits of an existing message. In another alternative, the mere presence of the at least one parameter may be regarded as the indication. Thus, the indication may be implicitly present in the message. The indication may be received on a broadcast channel in the first cell 970.

After having received the cell id and possibly other parameters over the first cell 970, the user equipment derives, 1050, at least one physical layer characteristic for the second cell 980, based on the parameters. The physical layer characteristics may be e.g. scrambling codes, reference signal configurations, or control signaling configurations. In particular, the cell identity may be used to derive the cell-specific reference signal configuration, DMRS, SRS, or MBSFN reference signal configuration, reference signal hopping pattern, PUSCH hopping pattern, downlink control channel configuration, uplink control channel configuration, and scrambling codes for PUSCH, PDSCH, and for L1/L2 control signaling. It is pointed out that it is well known in the art how to derive these characteristics, once the required parameters are known. Thus, this procedure will not be described in further detail in this disclosure.

Once the user equipment has derived at least one physical layer characteristic for the second cell 980, the user equipment 980 adds, 1060, a secondary cell corresponding to the received cell identity. That is to say, the user equipment 980 adds the second cell 980 as a secondary serving cell, or SCell. It is pointed out that once the necessary physical layer characteristics of the second cell 980 have been derived, the second cell 980 may be added as an SCell using known procedures, which will not be described further here.

It is now possible for the user equipment 980 to use the additional resources provided by the SCell, i.e. the user equipment 980 may receive transmissions over component carrier f2, i.e. over the second cell 980. The user equipment 980 may additionally perform uplink transmissions on the uplink carrier which is linked to component carrier f2.

In a variant of this embodiment, the user equipment 920 receives, 1030, over the first cell 970, an indication that no cell-specific reference signals are detectable in the second cell 980. The user equipment 920 may, in response to this indication, refrain from performing any measurement on cell-specific reference signals in the second cell, e.g. the user equipment 920 may refrain from mobility measurements based on CRS. This may be advantageous in cases where the CRS are muted, i.e. transmitted with reduced or zero power, in the second cell 980, as an attempt to measure on the undetectable CRS may result in unspecified behavior in the terminal. The same applies in deployments where CRS are transmitted, but high interference from neighboring cells makes it impossible to receive the CRS with sufficient good quality.

In a further variant, the user equipment 920 receives, 1040, over the first cell 960, information indicating a user-specific reference signal configuration associated with the user equipment 920 in the second cell 980. This may be beneficial for instance when the cell-specific reference signals cannot be detected. As mentioned above, CRS are more prone to interference from other cells since they are typically transmitted on predefined resources. However, user-specific reference signals are transmitted in a pattern specific to the user equipment 920, so that they do not collide with reference signals transmitted in other cells. Therefore, it may be more advantageous for the user equipment 920 to perform measurements on user-specific reference signals, when these are available.

Thus, according to this embodiment, the cell identity of the second cell 980 is transmitted over the first cell 970. The user equipment may use this cell id to derive various synchronization-related parameters associated with the second cell 980. This will enable the user equipment 920 to receive transmissions over the second cell 980.

It should be noted that in FIG. 9, cell 980 has been indicated with a dashed circle, and drawn slightly smaller than cell 970 for ease of viewing. This does not necessarily reflect the relation between the actual geographical coverage areas of cells 970 and 980. As the skilled person will realize, cells 970 and 980 may have the same geographical coverage, or cell 970 may be smaller than cell 980, or their coverage areas may differ in various other ways due to e.g. different fading characteristics. Also, the actual coverage areas are not necessarily circular. It is further pointed out that, although the present embodiment is described in the context of the scenario of FIG. 9, the described method is applicable in other scenarios as well—for instance, in the scenario of FIG. 4(*b*), where the user equipment cannot hear a macro cell because of interference from a nearby CSG cell, or in a scenario where transmission on one carrier frequency is muted to protect signals in another cell, as described above. Thus, cells 970 and 980 may in other scenarios be served by a macro base station.

Furthermore, cells 970 and 980 are not necessarily served by the same physical base station. The cells could, for instance, emanate from different remote radio heads, or they could even be served by two neighboring base stations, assuming that the coverage areas of cells 970 and 980 overlap, and that carrier aggregation across multiple base stations is supported.

It should be noted that although the cell id and any additional parameters have been described here as being comprised in the request to add the secondary cell, it is equally possible to receive one or more of the parameters in a separate message. Also, one or more of the parameters may be received over a broadcast channel in the first cell 970, rather than in a dedicated message to the user equipment 920.

A method in a network node according to an embodiment will now be described, with reference to FIG. 9 and the flowchart in FIG. 11.

The scenario shown in FIG. 9 has already been described in connection with the previous embodiment. The present embodiment relates to a method performed in the network node 950, which serves the first cell 970 configured on carrier frequency f1, and the second cell 980 configured on carrier frequency f2. A user equipment 920 is connected to the first cell 970. As mentioned above, network node 950 may be realized as a pico or femto base station, e.g. as an LTE HeNB, but in some alternative scenarios the network node 950 may be a macro base station, such as an LTE eNB.

In this embodiment, the network node 950 serves the second cell 980, and transmits, 1120, synchronization signals, reference signals or parts of system information over the second cell 980 with reduced or zero power. As explained above, a reason for this muting may be that there is another nearby cell which is also configured on carrier frequency f2, and which is heavily interfered by transmissions in cell 980. Thus, the network node 950 may mute certain signaling in order to protect another cell. However, this will also prevent user equipment 920 from detecting the cell 980.

According to the method, the network node 950 transmits, 1110, a request to add a secondary cell, SCell. The request is transmitted over the first cell 970. The request to add the SCell comprises the cell identity of the second cell 980. In some variants, the cell identity is the physical cell identity of the second cell 980.

In some variants of this embodiment, the request may also comprise one or more other parameters associated with the second cell 980, e.g. carrier frequency, number of transmit antenna ports, bandwidth, cyclic prefix length indication.

The network node 950 also transmits, 1110, an indication to use the at least one parameter to derive at least one physical layer characteristic for the second cell 980. In other words, the indication tells the user equipment 920 that it should derive the physical layer characteristic from the received parameter, instead of trying to detect it in the air. The indication may be transmitted in the same message as the at least one parameter, or in a separate message. The indication may be realized as a flag, e.g. using one or more unused bits of an existing message. Alternatively, the indication may be transmitted on a broadcast channel in the first cell 970.

In some further variants, the network node 950 transmits a parameter only if it has a different value in the second cell 980 than in the first cell 970, or if it has a different value than a predetermined default value. For example, if the second cell 980 uses the same bandwidth and number of antenna ports as the first cell 970, those two parameters are not transmitted over the first cell 970. The user equipment 920 may then assume that the non-transmitted parameters have the same value as in the first cell, or that they have the same value as the predetermined default value.

In a variant of this embodiment, the network node 950 transmits, 1130, over the first cell 970, an indication that no cell-specific reference signals are detectable in the second cell 980. The user equipment 920 may, in response to this indication, refrain from performing any measurement on cell-specific reference signals in the second cell, as described above.

In some further variants, the network node 950 transmits, 1140, over the first cell, information indicating a user-specific reference signal configuration associated with the user equipment 920 in the second cell 980. The user-specific reference signal configuration may be used by the user equipment 920 as described in the previous embodiment.

By transmitting the necessary parameters over the first cell 970, the network node 950 enables the user equipment 980 to derive physical layer characteristics that are required to add the second cell 980 as an SCell. Once the user equipment 920 has successfully added the SCell, network node 950 may transmit information to user equipment 920 over component carrier f2, i.e. over the second cell 980.

As already stated in connection with the previous embodiment, the circles indicating cells 970 and 980 do not necessarily indicate the shape of the actual geographical coverage areas of the cells. It is further pointed out that in some scenarios, the network node 950 serves only the first cell 970, whereas the second cell 980 is served by another network node. This assumes that carrier aggregation across multiple nodes is supported, and that network node 950 acquires the required parameters associated with the second cell 980, e.g. from a message received from the network node which serves the second cell 980. It is also pointed out that, similarly to the previous embodiment, the present method is applicable even if muting is not applied in the second cell 980, since there could be various other reasons why user equipment 920 fails to detect the second cell 980.

It should be noted that although the cell id and any additional parameters have been described here as being comprised in the request to add the secondary cell, it is equally possible to transmit one or more of the parameters in a separate message. Also, one or more of the parameters may be transmitted over a broadcast channel in the first cell 970, rather than in a dedicated message to the user equipment 920.

A method in a user equipment according to another embodiment will now be described with reference to FIG. 12 and the flowchart in FIG. 13. This embodiment relates to mobility measurements performed by a user equipment 1210 in connected mode.

Figure 12:
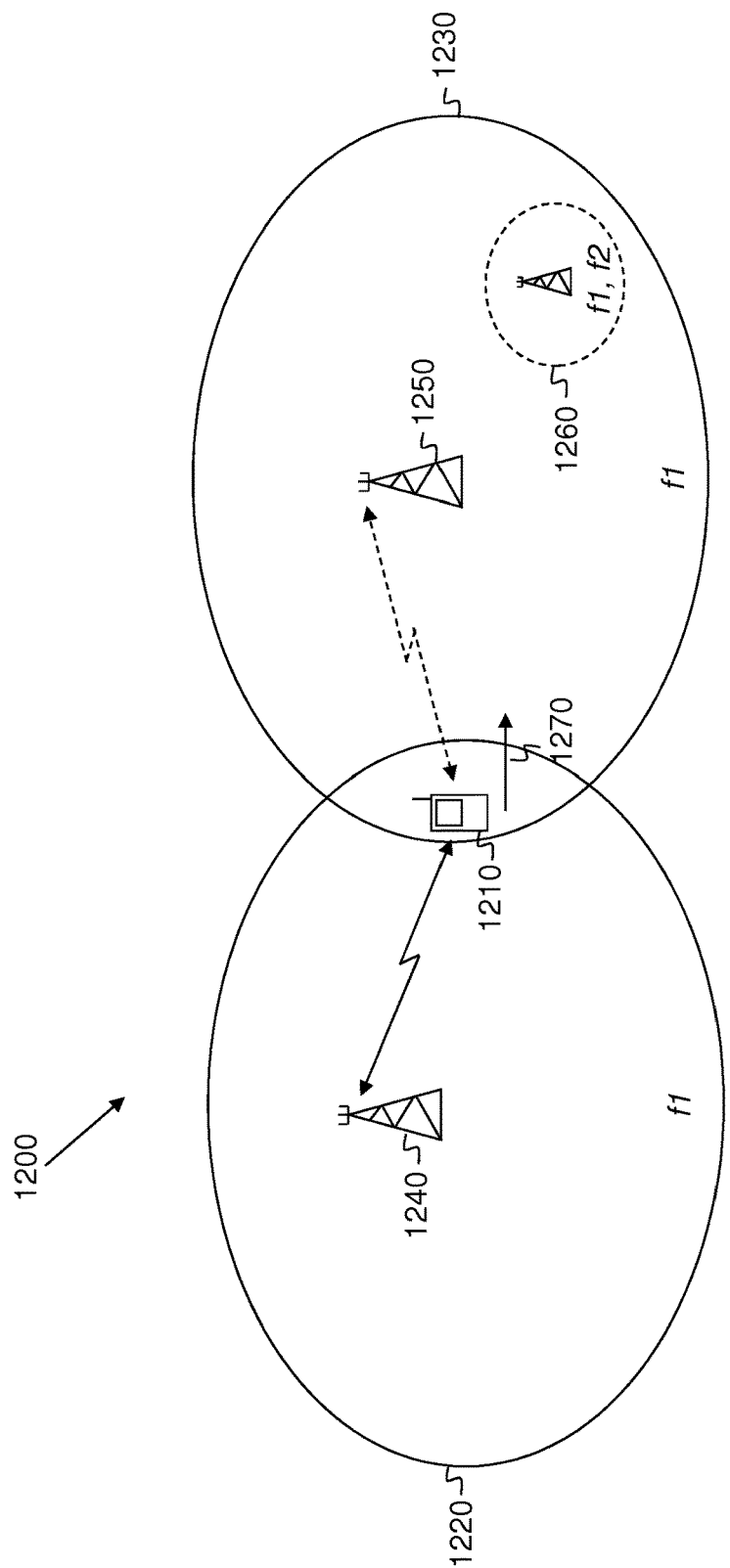
FIG. 12 is a schematic diagram illustrating a wireless communications network according to an embodiment.

FIG. 12 is a schematic drawing illustrating a wireless network 1200 comprising a first cell 1220 and a second cell 1230, with partly overlapping coverage areas. The first and second cells both operate on the same carrier frequency f1. The first cell 1220 is served by network node 1240, e.g. an LTE eNB. The second cell 1230 is served by network node 1250, e.g. another LTE eNB. Synchronization signals, reference signals, etc. will be transmitted in both cells 1220 and 1230. A user equipment 1210 is located within the coverage area of both cells 1220 and 1230, and is currently connected to cell 1220. The user equipment 1210 is moving in the direction of the arrow 1270. Thus, the user equipment 1210 is getting closer to network node 1250 and it would be advantageous for the user equipment 1210 to perform mobility measurements on cell 1230, so that a handover decision may eventually be made. However, in this example the user equipment 1210 is not able to detect and/or decode information transmitted over the second cell 1230. A possible cause of this problem is that network node 1240 is transmitting with a higher power on f1, causing severe interference to the synchronization channels, broadcast channels, and/or reference signals in cell 1230. Another possibility is that network node 1250 is transmitting with reduced or zero power on the synchronization and/or broadcast channels, for instance to protect nearby pico cell 1260 which is also configured to use carrier frequency f1. Therefore, user equipment 1210 is not able to derive necessary parameters, e.g. cell id, for the second cell 1230, which are needed to receive the cell-specific reference signals, CRS. Consequently, user equipment 1210 cannot perform mobility measurements on cell 1230, which may lead to reduced throughput for user equipment 1210 as it moves further away from network node 1240, and possibly even to a dropped connection if the user equipment 1210 moves into the region which is only covered by cell 1230, without being able to detect the presence of the cell.

According to the method, the user equipment 1210 receives, 1310, a request to perform measurements on the second cell 1230. The request is received over the first cell 1220. The measurement request comprises the cell identity of the second cell 1230. In some variants, the cell identity is the physical cell identity of the second cell 1230.

In some variants of this embodiment, the request may also comprise other parameters associated with the second cell 1230. For example, one or more of the parameters carrier frequency, number of transmit antenna ports, bandwidth, cyclic prefix length indication related to the second cell 1230 may be received over the first cell 1220. The number of transmit antennas influence the CRS because each antenna port transmits its own cell-specific reference signals. To be able to reconstruct the CRS the user equipment 1210 needs to know if they are present or not; thus, it needs to know how many antenna ports are used for transmission. However, if the user equipment 1210 does not receive one or more of these parameters, the user equipment 1210 may assume default values for any parameters that were not received. In particular, the user equipment 1210 may assume that the non-received parameters have the same value in the second cell 1230 as in the first cell 1220. Therefore, it is not necessary that all parameters associated with the second cell 1230 are received over the first cell 1220.

In some variants, the user equipment 1210 also receives, 1320, an indication over the first cell 1220 to use the received parameters, i.e. the cell id and any additional parameters, to derive at least one physical layer characteristic for the second cell 1230. In other words, the indication tells the user equipment 1210 that it should derive the physical layer characteristic from the received parameter, instead of trying to detect it in the air. An advantage of receiving the indication is that the user equipment does not need to spend time and resources on unnecessary attempt to decode signals from the second cell 1230, which could not be successful anyway. However, in other variants the user equipment 1210 always uses the received parameters, if present, to derive the physical layer characteristics. In yet other variants, the user equipment 1210 first tries to detect the parameters for the second cell 1230 over the air, and if this fails it uses the parameters received over the first cell 1220.

It should be noted that the indication may be received in the same message as the at least one parameter, or it may be received in a separate message. The indication may be realized as a flag, e.g. using one or more unused bits of an existing message. In another alternative, the mere presence of the at least one parameter may be regarded as the indication. Thus, the indication may be implicitly present in the message. The indication may be received on a broadcast channel in the first cell 1220.

After having received the cell id and possibly other parameters over the first cell 1220, the user equipment 1210 derives, 1330, the cell-specific reference signal configuration for the second cell 1230, based on the parameters. To be able to derive the CRS, the user equipment 1210 may need to derive other physical layer characteristics as well, e.g. the PBCH scrambling code.

Once the CRS configuration has been determined, the user equipment 1210 performs a measurement of the CRS of the second cell 1230 using the derived CRS configuration. In other words, the user equipment 1210 performs a mobility measurement on cell 1230.

The user equipment 1210 then transmits a measurement report comprising the result of the measurement to its serving network node, i.e. network node 1240 in this example. The serving network node may use the measurement report to make a handover decision, possibly handing over the connection with user equipment 1210 to cell 1230.

In the present example, it has been assumed that user equipment 1210 receives the required parameters from its serving cell, i.e. cell 1220. However, it is also possible that the user equipment 1210 is not connected to the first cell 1220, but to a third cell (not shown in FIG. 12). If the parameters for the second cell 1230 are broadcast in the first cell 1220, the user equipment 1210 may be able to acquire the parameters even though it is not currently connected to the first cell 1220. Any measurement report would then be sent to the serving cell.

It should be noted that although the cell id and any additional parameters have been described here as being comprised in the measurement request, it is equally possible to receive one or more of the parameters in a separate message. Also, one or more of the parameters may be received over a broadcast channel in the first cell 1220, rather than in a dedicated message to the user equipment 1210.

A method in a user equipment according to another embodiment will now be described with reference to FIG. 12 and the flowchart in FIG. 14. The basic scenario of FIG. 12 has already been described above, i.e. user equipment 1210 is located in the mutual coverage areas of cells 1220 and 1230, and moving in the direction of arrow 1270 away from the coverage of cell 1220. However, in the present embodiment, user equipment 1210 is in idle mode, and it is desirable to perform mobility measurements on cell 1230 for the purpose of a possible cell reselection. As already explained above, this means that user equipment 1210 needs to measure on the cell-specific reference signals, CRS, of cell 1230; however, the user equipment 1210 cannot derive the CRS configuration because of interference from cell 1220.

According to the method, the user equipment 1210 receives, 1410, at least one parameter associated with the second cell 1230. The request is received over the first cell 1220. The at least one parameter comprises the cell identity of the second cell 1230. In some variants, the cell identity is the physical cell identity of the second cell 1230.

In some variants of this embodiment, the user equipment 1210 also receives other parameters associated with the second cell 1230. For example, one or more of the parameters carrier frequency, number of transmit antenna ports, bandwidth, cyclic prefix length indication related to the second cell 1230 may be received over the first cell 1220. The number of transmit antennas influence the CRS, because each antenna port transmits its own cell-specific reference signals. To be able to reconstruct the CRS the user equipment 1210 needs to know if they are present or not; thus, it needs to know how many antenna ports are used for transmission. However, if the user equipment 1210 does not receive one or more of these parameters, the user equipment 1210 may assume default values for any parameters that were not received. In particular, the user equipment 1210 may assume that the non-received parameters have the same value in the second cell 1230 as in the first cell 1220. Therefore, it is not necessary that all parameters associated with the second cell 1230 are received over the first cell 1220.

In some variants, the user equipment 1210 also receives, 1420, an indication over the first cell 1220 to use the received parameters, i.e. the cell id and any additional parameters, to derive at least one physical layer characteristic for the second cell 1230. In yet other variants, the user equipment 1210 first tries to detect the parameters for the second cell 1230 over the air, and if this fails it uses the parameters received over the first cell 1220. It should be noted that the indication may be received in the same message as the at least one parameter, or it may be received in a separate message. The indication may be realized as a flag, e.g. using one or more unused bits of an existing message. In another alternative, the mere presence of the at least one parameter may be regarded as the indication. Thus, the indication may be implicitly present in the message.

Note that in this embodiment, the one or more parameters, and the indication, are all received on a broadcast channel in the first cell 1220, since the user equipment 1210 is in idle mode.

After having received the cell id and possibly other parameters over the first cell 1220, the user equipment 1210 derives, 1430, the cell-specific reference signal configuration for the second cell 1230, based on the parameters. To be able to derive the CRS, the user equipment 1210 may need to derive other physical layer characteristics as well, e.g. the PBCH scrambling code.

Once the CRS configuration has been determined, the user equipment 1210 performs a measurement, 1440, on the CRS of the second cell 1230 using the derived CRS configuration. In other words, the user equipment 1210 performs a mobility measurement on cell 1230.

Depending on the result of the measurement, the user equipment 1210 may decide to initiate a cell reselection procedure, according to known mechanisms.

Figure 15:
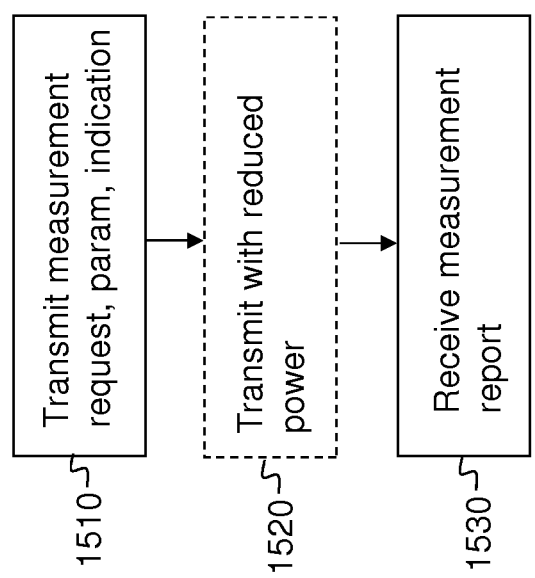
FIG. 15 is a flow chart illustrating a method according to an embodiment.

A method in a network node according to another embodiment will now be described with reference to FIG. 12 and the flowchart in FIG. 15. Here, a scenario is described where network node 1240 requests user equipment 1210 to perform mobility measurements on cell 1230; thus, the embodiment is similar to the one described in connection with FIG. 13 above, but here the focus is on a method performed in the network node 1240.

According to the method, the network node 1240 transmits, 1510, a request to the user equipment 1210 to perform measurements on the second cell 1230. The request is transmitted over the first cell 1220. The measurement request comprises the cell identity of the second cell 1230. In some variants, the cell identity is the physical cell identity of the second cell 1230.

In some variants of this embodiment, the request may also comprise other parameters associated with the second cell 1230. For example, one or more of the parameters carrier frequency, number of transmit antenna ports, bandwidth, cyclic prefix length indication related to the second cell 1230 may be transmitted over the first cell 1220. The number of transmit antennas influence the CRS because each antenna port transmits its own cell-specific reference signals. To be able to reconstruct the CRS the user equipment 1210 needs to know if they are present or not; thus, it needs to know how many antenna ports are used for transmission.

The network node 1240 also transmits, 1510, an indication to use the at least one parameter to derive at least one physical layer characteristic for the second cell 1230. In other words, the indication tells the user equipment 1210 that it should derive the physical layer characteristic from the received parameter, instead of trying to detect it in the air. The indication may be transmitted in the same message as the at least one parameter, or in a separate message. The indication may be realized as a flag, e.g. using one or more unused bits of an existing message. Alternatively, the indication may be transmitted on a broadcast channel in the first cell 1220. In another alternative, the mere presence of the at least one parameter may be regarded as the indication. Thus, the indication may be implicitly present in the message.

By transmitting the parameters and indication over the first cell 1220, the network node 1240 enables the user equipment 1210 to derive the necessary physical layer characteristics for the second cell 1230. This will allow the user equipment 1210 to perform the requested measurements even it could not initially detect cell 1230.

The network node 1240 then receives, 1530, a measurement report from user equipment 1210. Network node 1240 may use the measurement report to make a handover decision, possibly handing over the connection with user equipment 1210 to cell 1230.

In some variants of this embodiment, the network node 1240 serves the second cell 1230, and transmits, 1520, synchronization signals, reference signals or parts of system information over the second cell 1230 with reduced or zero power. As explained above, a reason for this muting may be that there is another nearby cell which is also configured on carrier frequency f1, and which is heavily interfered by transmissions in cell 1230. Thus, the network node 1240 may mute certain signaling in order to protect pico cell 1260. However, this may also prevent user equipment 1210 from detecting the cell 1230. It should be noted, however, that the method is also applicable when muting is not used, since there are various other reasons that could prevent user equipment 1210 from detecting signals in cell 1230.

It should be noted that although the cell id and any additional parameters have been described here as being comprised in the measurement request, it is equally possible to transmit one or more of the parameters in a separate message. Also, one or more of the parameters may be transmitted over a broadcast channel in the first cell 1220, rather than in a dedicated message to the user equipment 1210.

Figures 16, 17:
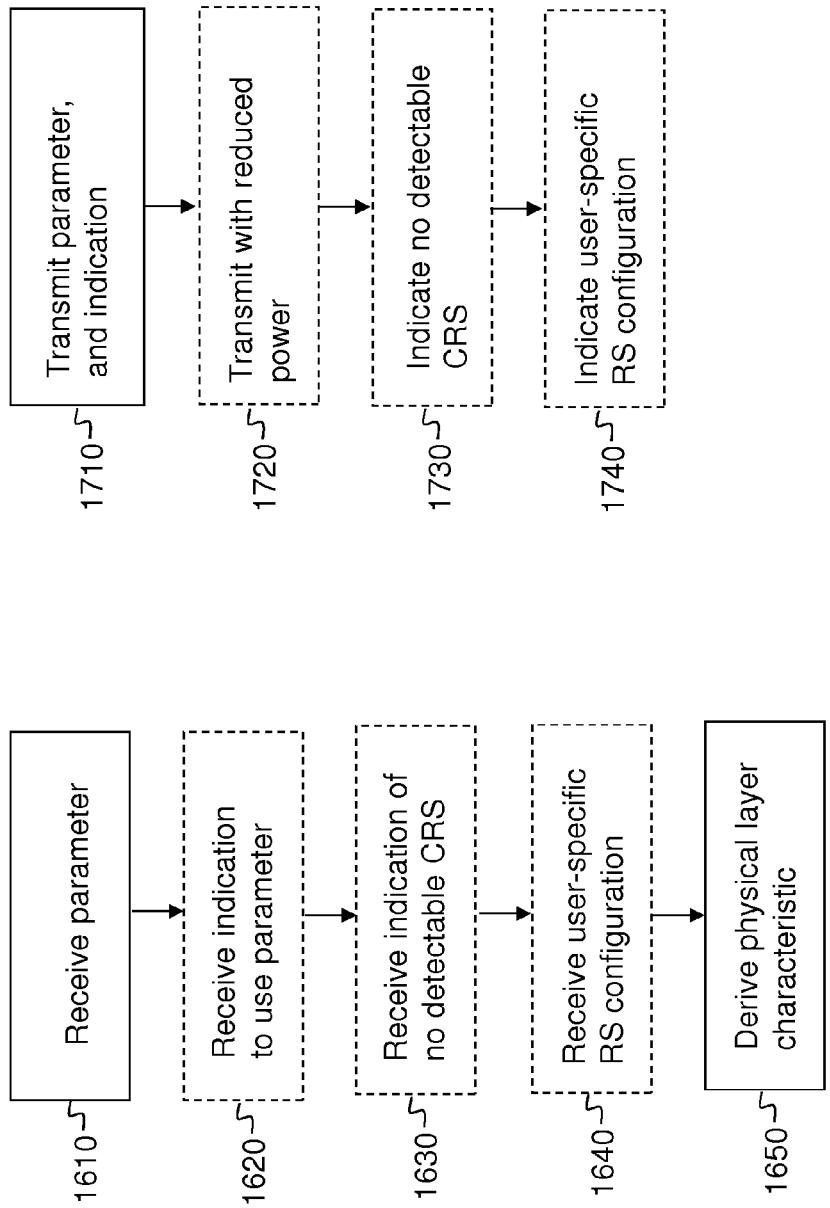
FIG. 16 is a flow chart illustrating a method according to an embodiment.
FIG. 17 is a flow chart illustrating a method according to an embodiment.

A general method performed in a user equipment according to several embodiments will now be described with reference to the flow chart of FIG. 16.

The user equipment receives, 1610, over a first cell configured on a carrier frequency, at least one parameter associated with a second cell configured on a carrier frequency. The at least one parameter comprises a cell identity.

As mentioned in the specific embodiments discussed above, the first and second cells may be configured on the same, or different, carrier frequencies. In some embodiments, the first cell is the PCell of the user equipment.

In some embodiments, the user equipment also receives, 1620, over the first cell, an indication to use the at least one parameter to derive at least one physical characteristic for the second cell.

In some embodiments, the user equipment also receives, 1630, over the first cell, an indication that no CRS are detectable in the second cell.

In some further embodiments, the user equipment receives, 1640, an indication of a user-specific reference signal configuration over the first cell.

The user equipment then derives, 1650, at least one physical layer characteristic for the second cell based on the received at least one parameter, thereby enabling the user equipment to receive transmissions over the second cell. In some embodiments, the user equipment may proceed to add the second cell as an SCell. In other embodiments, the user equipment may derive a CRS configuration for the second cell, and use this to perform mobility measurements in idle mode or connected mode.

A general method performed in a network node according to several embodiments will now be described with reference to the flow chart of FIG. 17. The network node serves a first cell configured on a carrier frequency.

According to the method, the network node transmits, 1710, over the first cell, at least one parameter associated with a second cell configured on a carrier frequency. The at least one parameter comprises a cell identity. The network node also transmits an indication to use the at least one parameter to derive at least one physical layer characteristic for the second cell. The cell identity and possible other parameters may be comprised in a measurement request message sent to a user equipment, or they may be included in a request to add the second cell as an SCell.

In some embodiments, the network node serves also the second cell, and transmits synchronization signals, reference signals, or part of system information over the second cell with reduced or zero power.

In some embodiments, the network node also transmits, 1730, over the first cell, an indication that no CRS are detectable in the second cell.

In some further embodiments, the network node transmits, 1740, an indication of a user-specific reference signal configuration over the first cell.

Figures 18, 19:
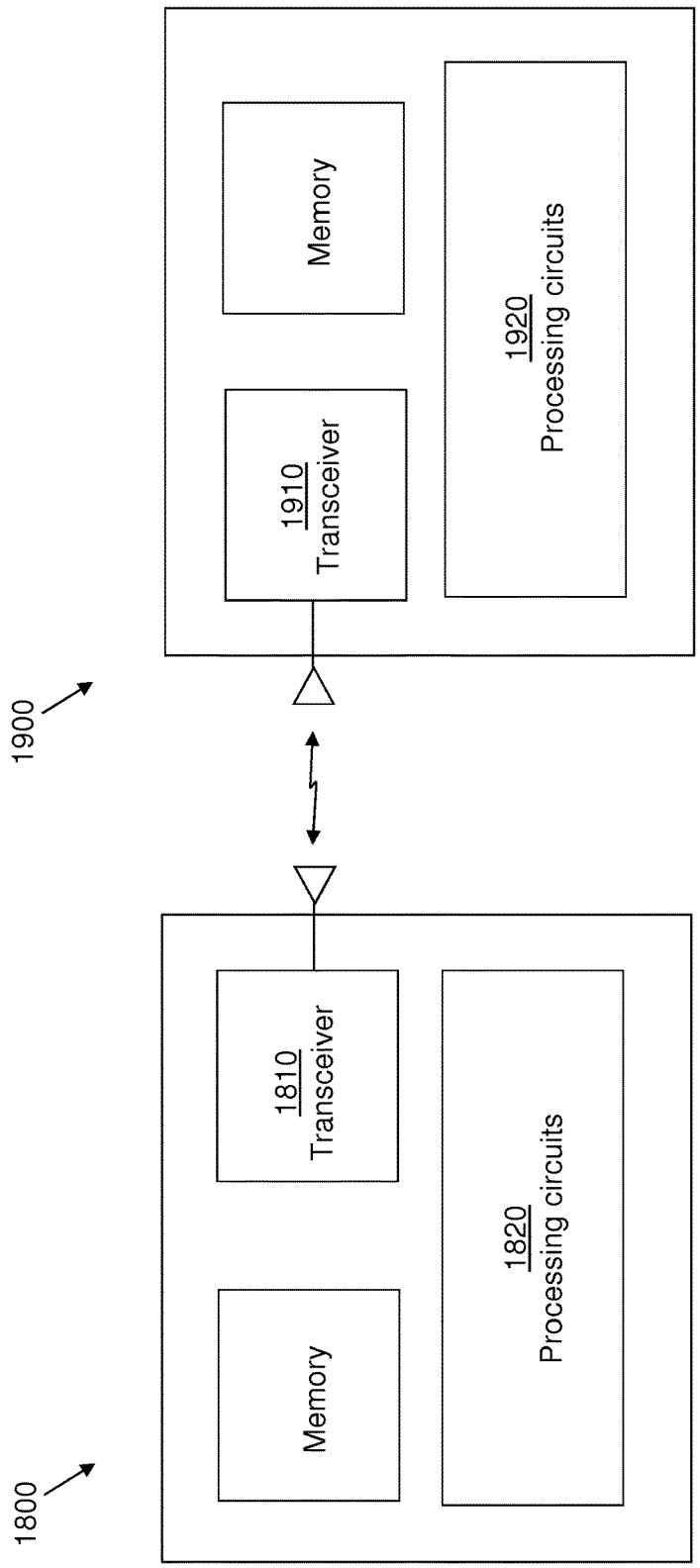
FIG. 18 is a block diagram illustrating a user equipment according to an embodiment.
FIG. 19 is a block diagram illustrating a network node according to an embodiment.

FIGS. 18 and 19 illustrate example implementations of user equipment 920, 1110, and network node 940, 1140. It is pointed out that these devices may include computer-based circuitry, such as one or more circuits based on microprocessors, digital signal processors, ASICs, FPGAs, or other programmable or programmed digital processing circuitry. The operation of these devices may be implemented in whole or in part by configuring the device via the execution of stored computer programs, held in memory or other computer-readable media to which the device has access. Thus, it should be appreciated that the processing circuits illustrated in FIGS. 18 and 19 may be implemented in hardware, software, or a combination of both.

FIG. 18 illustrates a user equipment 1800, comprising a transceiver 1810 and one or more processing circuits 1820. The processing circuits 1820 are configured to receive, over a first cell 970 configured on a carrier frequency, at least one parameter associated with a second cell 980 configured on a carrier frequency. The at least one parameter comprises a cell identity. The processing circuits 1820 are further configured to derive at least one physical layer characteristic for the second cell 980 based on the received at least one parameter, thereby enabling the user equipment 920 to receive transmissions over the second cell 980. The at least one parameter may further comprise one or more of: carrier frequency, number of transmit antenna ports, bandwidth, cyclic prefix length indication.

In some variants, the processing circuits 1820 are further configured to receive, over the first cell 970, an indication that the user equipment 970 should use the received at least one parameter to derive at least one physical layer characteristic for the second cell 980. The at least one physical layer characteristic may comprise one or more of: a PUSCH, PDSCH, L1/L2 control signaling or CRC of PBCH scrambling code, a cell-specific reference signal configuration, a sounding reference signal configuration, an MBSFN reference signal configuration, an uplink demodulation reference signal configuration, a downlink or uplink control signaling configuration, a reference signal hopping pattern, or a PUSCH hopping pattern.

In some further variants, the processing circuits 1820 are further configured to receive, over the first cell 970, an indication that no cell-specific reference signals are detectable in the second cell 980. The processing circuits 1820 may be further configured to, in response to the indication that no cell-specific reference signals are detectable, not attempt to perform any measurement on cell-specific reference signals in the second cell 980.

In some variants, the processing circuits 1820 are further configured to receive, over the first cell 970, information indicating a user-specific reference signal configuration associated with the user equipment 920 in the second cell 980.

In some variants, the processing circuits 1820 are further configured to receive the at least one parameter over a broadcast channel.

In some other variants, the processing circuits 1820 are configured to receive the at least one parameter in a measurement request. The processing circuits 1820 may be further configured to detect the second cell (980) by means of the cell identity received in the measurement request message. The processing circuits 1820 may be further configured to perform a measurement of a signal, e.g. a cell-specific reference signal, received over the second cell 980, by means of a received reference signal configuration, and to transmit a measurement report.

In some other variants, the processing circuits 1820 are configured to receive the at least one parameter in a request to add a secondary cell. The processing circuits 1820 may be further configured to add a secondary cell corresponding to the received cell identity.

In some variants, the processing circuits 1820 are configured to assume that, if the user equipment 920 does not receive one or more of the parameters carrier frequency, number of transmit antenna ports, bandwidth, or cyclic prefix length indication, the parameters not received have the same value in the second cell 980 as in the first cell 970.

The user equipment 1800 may comprise more than one transceiver.

FIG. 19 illustrates a network node 1900, comprising a transceiver 1910 and one or more processing circuits 1920. The processing circuits 1920 are configured to transmit, over a first cell 970 configured on a carrier frequency, at least one parameter associated with a second cell 980 configured on a carrier frequency, wherein the at least one parameter comprises a cell identity. The processing circuits 1920 are further configured to transmit an indication to use the at least one parameter to derive at least one physical layer characteristic for the second cell 980. The at least one parameter may further comprise one or more of: carrier frequency, number of transmit antenna ports, bandwidth, cyclic prefix length indication.

In some variants, the processing circuits 1920 are further configured to transmit synchronization signals, reference signals or parts of system information over the second cell 980 with reduced or zero power;

In some variants, the processing circuits 1920 are further configured to transmit, over the first cell 970, an indication that no cell-specific reference signals are detectable in the second cell 980.

In some variants, the processing circuits 1920 are further configured to transmit, over the first cell 970, information indicating a user-specific reference signal configuration associated with a user equipment 920 in the second cell 980.

In some variants, the processing circuits 1920 are further configured to perform the transmissions over a broadcast channel.

In some other variants, the processing circuits 1920 are further configured to perform the transmissions in a dedicated message to a user equipment 920, e.g. a measurement request or a request to add a secondary cell.

In some variants, the processing circuits 1920 are further configured to transmit a parameter only if it has a different value in the second cell 980 than in the first cell 970.

The network node 1900 may comprise more than one transceiver.

The solutions described above have been detailed in connection with carrier aggregation and heterogeneous networks, as specified for LTE networks. However, those skilled in the art will appreciate that the techniques and concepts described herein are more generally applicable to other wireless communication systems, where interference prevents a mobile terminal from detecting and/or communicating with a cell. Particular embodiments disclosed herein address carrier aggregation and/or the layered use of primary and secondary cells, i.e. heterogeneous systems in general. Thus, the present disclosure is not limited to LTE implementations.

Some embodiments disclosed herein enable acquisition of cell ID of a cell configured on a component carrier and, optionally, number of transmit antenna ports, carrier frequency, bandwidth, cyclic prefix length indication for a component carrier on which PSS/SSS and PBCH are transmitted with reduced/zero power or received with bad quality due to high interference. This is needed in carrier aggregation based heterogeneous network deployments.

Those skilled in the art will further appreciate that the various methods and processes described herein may be implemented using various hardware configurations, generally, but not necessarily including the use of one or more microprocessors, microcontrollers, digital signal processors, or the like, coupled to memory storing software instructions for carrying out the techniques described herein. As the design and cost tradeoffs for the various hardware approaches, which may depend on system-level requirements that are outside the scope of the present disclosure, are well known to those of ordinary skill in the art, further details of specific hardware implementations are not provided herein.

Various embodiments of the techniques and concepts include radio base stations, such as LTE eNBs, comprising processing circuits configured to carry out the processes discussed above. Other embodiments include mobile terminals comprising processing circuits configured to carry out processes complementary to those performed by the base stations, plus, in some cases, additional processes.

Thus, the present disclosure is not limited to the above-describe preferred embodiments. Various alternatives, modifications and equivalents may be used. Therefore, the above embodiments should not be taken as limiting the scope of the disclosure, which is defined by the appending claims.

When the word "comprise" or "comprising" is used in this disclosure, it is intended to be interpreted as non-limiting, i.e. meaning "consist at least of".

What is claimed is:

1. A method in a user equipment, the method comprising:
   receiving, over a first cell configured on a carrier frequency, parameters associated with a second cell configured on a carrier frequency, wherein the parameters comprise a cell identity and a number of transmit antenna ports; and
   deriving at least one physical layer characteristic for the second cell based on both of the received parameters, thereby enabling the user equipment to receive transmissions over the second cell.

2. The method of claim 1, further comprising receiving, over the first cell, an indication that the user equipment should use the received parameters to derive at least one physical layer characteristic for the second cell.

3. The method of claim 1, further comprising receiving, over the first cell, an indication that no cell-specific reference signals are detectable in the second cell.

4. The method of claim 3, wherein, in response to the indication that no cell-specific reference signals are detectable, the user equipment does not attempt to perform any measurement on cell-specific reference signals in the second cell.

5. The method of claim 1, wherein the at least one physical layer characteristic comprises one or more of: a scrambling code, a reference signal configuration, a control signaling configuration.

6. The method of claim 5, wherein at least one physical layer characteristic comprises one or more of: a PUSCH scrambling code, a PDSCH scrambling code, a L1/L2 control signaling scrambling code.

7. The method of claim 5, wherein the at least one physical layer characteristic comprises one or more of: a cell-specific reference signal configuration, a sounding reference signal configuration, an MBSFN reference signal configuration, an uplink demodulation reference signal configuration, a reference signal hopping pattern, a PUSCH hopping pattern, a downlink control channel configuration, an uplink control channel configuration.

8. The method of claim 1, wherein the parameters further comprises one or more of: carrier frequency, bandwidth, cyclic prefix length indication.

9. The method of claim 1, wherein the at least one physical layer characteristic comprises a reference signal configuration, the method further comprising:
   performing a measurement of a signal received over the second cell based on the reference signal configuration; and
   transmitting a measurement report.

10. The method of claim 1, wherein the cell identity is included in a request to add a secondary cell.

11. The method of claim 10, further comprising adding a secondary cell corresponding to the received cell identity.

12. The method of claim 1, wherein the first cell is configured on the same carrier frequency as the second cell.

13. The method of claim 1, wherein if the user equipment does not receive one or more of the parameters carrier frequency, bandwidth, or cyclic prefix length indication, the user equipment assumes that the parameters not received have the same value in the second cell as in the first cell.

14. A method in a network node, the network node serving a first cell configured on a carrier frequency, the method comprising:
   transmitting, over the first cell, parameters associated with a second cell configured on a carrier frequency, wherein the parameters comprise a cell identity and a number of transmit antenna ports, and an indication to use the parameters to derive at least one physical layer characteristic for the second cell.

15. The method of claim 14, wherein the network node serves the second cell, the method further comprising transmitting synchronization signals, reference signals or parts of system information over the second cell with reduced or zero power.

16. The method of claim 14, wherein the parameters further comprise one or more of: carrier frequency, bandwidth, cyclic prefix length indication.

17. The method of claim 14, further comprising transmitting, over the first cell, an indication that no cell-specific reference signals are detectable in the second cell.

18. The method of claim 14, wherein for each of the parameters carrier frequency, bandwidth, or cyclic prefix length indication, the network node transmits the parameter only if it has a different value in the second cell than in the first cell.

19. A mobile terminal, comprising a transceiver and one or more processing circuits, wherein the processing circuits are configured to:
   receive, over a first cell configured on a carrier frequency, parameters associated with a second cell configured on a carrier frequency, wherein the parameters comprise a cell identity and a number of transmit antenna ports; and
   derive at least one physical layer characteristic for the second cell based on the received at parameters, thereby enabling the user equipment to receive transmissions over the second cell.

20. A network node, comprising a transceiver and one or more processing circuits, the processing circuits being configured to:

transmit, over a first cell configured on a carrier frequency, parameters associated with a second cell configured on a carrier frequency, wherein the parameters comprise a cell identity and a number of transmit antenna ports, and an indication to use the parameters to derive at least one physical layer characteristic for the second cell.

\* \* \* \* \*

UNITED STATES PATENT AND TRADEMARK OFFICE
CERTIFICATE OF CORRECTION

PATENT NO. : 10,305,607 B2
APPLICATION NO. : 14/792218
DATED : May 28, 2019
INVENTOR(S) : Baldemair et al.

It is certified that error appears in the above-identified patent and that said Letters Patent is hereby corrected as shown below:

In the Specification

In Column 1, Line 8, delete "2011," and insert -- 2011, now Pat. No. 9,106,380, --, therefor.

In Column 5, Line 42, delete "UE:s," and insert -- UEs, --, therefor.

In Column 13, Lines 28-29, delete "user equipment 980" and insert -- user equipment 920 --, therefor.

In Column 13, Line 30, delete "user equipment 980" and insert -- user equipment 920 --, therefor.

In Column 13, Line 36, delete "user equipment 980" and insert -- user equipment 920 --, therefor.

In Column 13, Lines 37-38, delete "user equipment 980" and insert -- user equipment 920 --, therefor.

In Column 13, Lines 39-40, delete "user equipment 980" and insert -- user equipment 920 --, therefor.

In Column 15, Lines 47-48, delete "user equipment 980" and insert -- user equipment 920 --, therefor.

In Column 21, Line 36, delete "user equipment 970" and insert -- user equipment 920 --, therefor.

In Column 23, Lines 29-30, delete "above-describe" and insert -- above described --, therefor.

In the Claims

In Column 24, Line 65, in Claim 19, delete "received at parameters," and insert -- received parameters, --, therefor.

Signed and Sealed this
First Day of October, 2019

Andrei Iancu
*Director of the United States Patent and Trademark Office*